(12) United States Patent
Wang

(10) Patent No.: US 10,230,908 B2
(45) Date of Patent: *Mar. 12, 2019

(54) THERMAL IMAGING DEVICE AND THERMAL IMAGE PHOTOGRAPHING METHOD

(71) Applicant: MISSION INFRARED ELECTRO OPTICS TECHNOLOGY CO., LTD, Hangzhou, Zhejiang (CN)

(72) Inventor: Hao Wang, Hangzhou (CN)

(73) Assignee: MISSION INFRARED ELECTRO OPTICS TECHNOLOGY CO., LTD, Hangzhou (CN)

( * ) Notice: Subject to any disclaimer, the term of this patent is extended or adjusted under 35 U.S.C. 154(b) by 294 days.

This patent is subject to a terminal disclaimer.

(21) Appl. No.: 14/371,441

(22) PCT Filed: Jan. 10, 2013

(86) PCT No.: PCT/CN2013/070340
§ 371 (c)(1),
(2) Date: Jul. 10, 2014

(87) PCT Pub. No.: WO2013/104327
PCT Pub. Date: Jul. 18, 2013

(65) Prior Publication Data
US 2015/0042817 A1    Feb. 12, 2015

(30) Foreign Application Priority Data

Jan. 12, 2012   (CN) .......................... 2012 1 0008402
Jan. 12, 2012   (CN) .......................... 2012 1 0008404
Sep. 21, 2012   (CN) .......................... 2012 1 0353428

(51) Int. Cl.
*G01J 5/00*     (2006.01)
*H04N 5/33*     (2006.01)
(Continued)

(52) U.S. Cl.
CPC ........... *H04N 5/33* (2013.01); *H04N 5/23232* (2013.01); *H04N 5/23293* (2013.01);
(Continued)

(58) Field of Classification Search
USPC ................................................. 348/164, 165
See application file for complete search history.

(56) References Cited

U.S. PATENT DOCUMENTS 6,664,956 B1 * 12/2003 Erdem .................... G06T 17/20
345/419
2009/0015702 A1 * 1/2009 Garcia Alonso ... H04N 5/23222
348/333.02
(Continued)

OTHER PUBLICATIONS

ENVI(ENVI User's Guide, ENVI Version 4.1, Research Systems Inc., Sep. 2004 Edition).*

*Primary Examiner* — Behrooz M Senfi
*Assistant Examiner* — Ana Picon-Feliciano

(57) ABSTRACT

This invention provides a thermal imaging device and a thermal image photographing method. In the prior art, when the thermal imaging device is used, a photographing part, photographing angle, and photographing distance of a photographed object are selected according to subjective experience of users, thus lowering photographing speeds and having omissions, and a position, dimension, and angle of thermal images of similar photographed objects in infrared thermal images photographed each time are different, causing subsequent analysis trouble. In this invention, via a reference image with a specified position and specified dimension presented in the infrared thermal image and reflecting specified morphological characters of the photographed object, a visual reference of predetermined thermal image quality and photographing requirements of the photographing object is provided, assisting the users to correctly grasp imaging states and photographing distances of the
(Continued)

thermal image, thereby acquiring uniform normative thermal image of the photographed object.

37 Claims, 22 Drawing Sheets

(51) Int. Cl.
*H04N 9/64* (2006.01)
*H04N 5/232* (2006.01)
*H04N 5/262* (2006.01)
*H04N 5/265* (2006.01)

(52) U.S. Cl.
CPC ........... *H04N 5/265* (2013.01); *H04N 5/2621* (2013.01); *H04N 9/646* (2013.01); *G01J 2005/0077* (2013.01)

(56) References Cited

U.S. PATENT DOCUMENTS

| | | | | |
|---|---|---|---|---|
| 2009/0302219 | A1* | 12/2009 | Johnson | G01C 3/08 250/332 |
| 2010/0182433 | A1* | 7/2010 | Shimbo | G06K 9/00771 348/153 |
| 2010/0225766 | A1* | 9/2010 | Haigh | G01J 5/02 348/164 |
| 2013/0155249 | A1* | 6/2013 | Neeley | H04N 5/33 348/159 |

* cited by examiner

| information of photographed objects | type | constituted data | position information |
|---|---|---|---|
| photographed object h6 | contour | vector image data of contour image T6 | position information of contour image T6 in infrared thermal image |
| photographed object h7 | contour | vector image data of contour image T7 | position information of contour image T7 in infrared thermal image |
| ... | ... | ... | ... |

| information of photographed objects | type | constituted data | position information |
|---|---|---|---|
| photographed object h6 | contour | vector image data of contour image T6 | position information of contour image T6 in infrared thermal image |
| | texture | lattice data of texture image W6 | position information of texture image W6 in infrared thermal image |
| | analyzed area | constituted data of analyzed area F6 | position information of analyzed area F6 in infrared thermal image |
| | … | … | … |
| photographed object h7 | contour | vector image data of contour image T7 | position information of contour image T7 in infrared thermal image |
| | texture | lattice data of texture image W7 | position information of texture image W7 in infrared thermal image |
| | analyzed area | constituted data of analyzed area F7 | position information of analyzed area F7 in infrared thermal image |
| | … | … | … |
| … | … | … | … |

FIG. 5

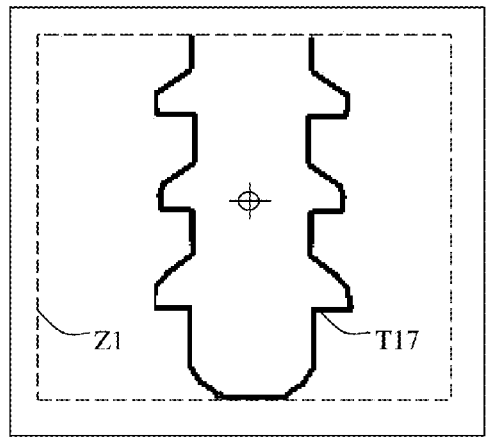
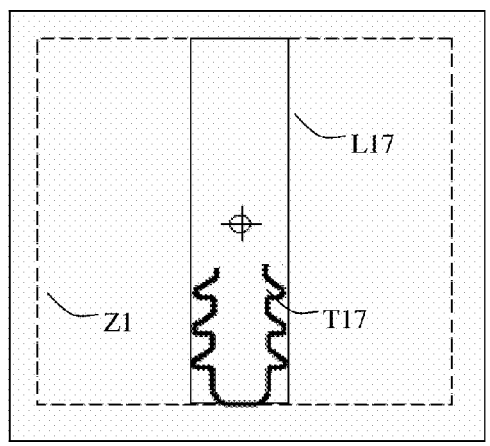
FIG. 17  FIG. 18
| information of photographed objects | type | constituted data |
|---|---|---|
| photographed object h6 | contour | vector image data of contour image T6 |
| photographed object h7 | contour | vector image data of contour image T7 |
| ... | ... | ... |
FIG. 19

| information of photographed objects | type | constituted data | position information |
|---|---|---|---|
| photographed object h6 | contour | vector image data of contour image T6 | |
| | texture | lattice data of texture image W6 | position information of texture image W6 relative to contour image T6 |
| | analyzed area | constituted data of analyzed area F6 | position information of analyzed area F6 relative to contour image T6 |
| | ... | ... | ... |
| photographed object h7 | contour | vector image data of contour image T7 | |
| | texture | lattice data of texture image W7 | position information of texture image W7 relative to contour image T7 |
| | analyzed area | constituted data of analyzed area F7 | position information of analyzed area F7 relative to contour image T7 |
| | ... | ... | ... |
| ... | ... | ... | ... |

FIG. 20

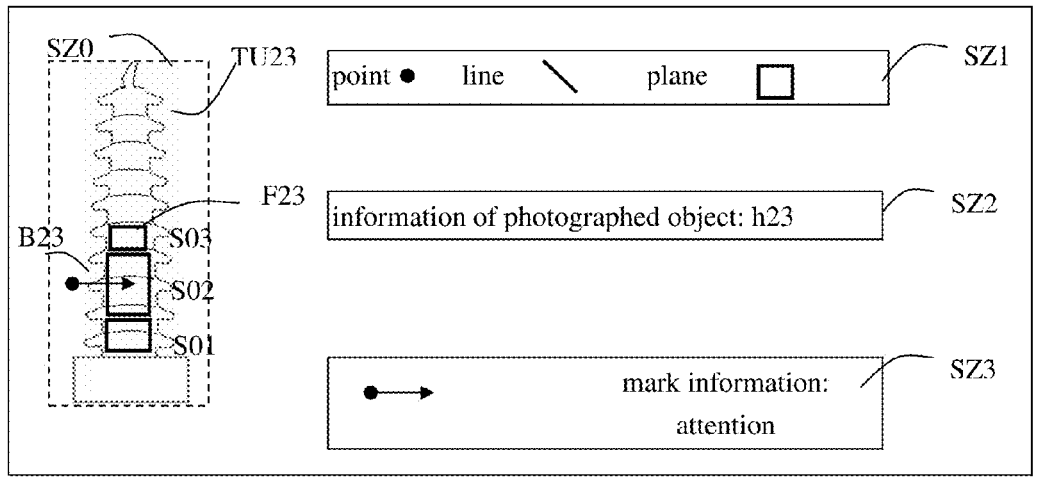
FIG. 25
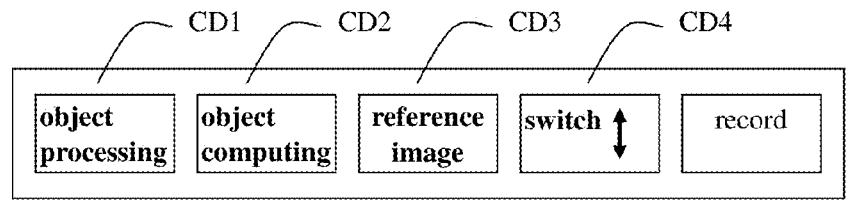
FIG. 26
| | CD11 | CD12 | CD13 | object processing | | |
|---|---|---|---|---|---|---|
| constituted data | processing object | processing rule | | | | |
| | | cutting | range extracting | edge extracting | ... | |
| contour | ● | ● | | | | |
| texture | | | | | | |
| ... | | | | | | |
FIG. 27

| | | rule and parameter | | | | | |
|---|---|---|---|---|---|---|---|
| constituted data | computing object | scaling | warping | center line | bounding rectangle | feature point | ... |
| contour | ● | | | ● | | | |
| texture | | | | | | | |
| analyzed area | | | | | | | |
| contour (processing) | | | | | | | |
| ... | | | | | | | |

CD21, CD22, CD23 — object computing

| CD31 | CD32 | CD33 | | | | CD34 | | | reference image |
|---|---|---|---|---|---|---|---|---|---|
| constituted data | reference image | position rule | | | | synthesized parameter | | | |
| | | main object | self-adaption | assigned position | relevance | synthesized order | transparency ratio | color | relevance |
| contour | ● | ● | ● | | | 1 | 1 | | |
| texture | | | | | | | | | |
| analyzed area | ● | | | | | 2 | 1 | | |
| contour (computing) | | | | | | | | | |
| contour (processing) | | | | | | | | | |
| ... | | | | | | | | | |

FIG. 30

| CD41 | CD42 | CD43 | | | | CD44 | | | switch ⇕  CD40 |
|---|---|---|---|---|---|---|---|---|---|
| constituted data | reference image | position rule | | | | synthesized parameter | | | |
| | | main object | self-adaption | assigned position | relevance | synthesized order | transparency ratio | color | relevance |
| contour | ● | | | | | 1 | 1 | | |
| texture | | | | | | | | | |
| analyzed area | ● | ● | ● | | | 2 | 1 | | |
| contour (computing) | | | | | | | | | |
| contour (processing) | | | | | | | | | |
| infrared thermal image | | | | | | | | | |

FIG. 31

THERMAL IMAGING DEVICE AND THERMAL IMAGE PHOTOGRAPHING METHOD

BACKGROUND OF THE INVENTION

Field of the Invention

This invention relates to a thermal imaging device, a thermal image processing device, and an infrared detection field and, more particularly, to a thermal imaging device and a thermal image photographing method.

Description of the Related Art

As prior art, a thermal imaging device is used for imaging by receiving infrared radiation energy of a photographed object, and a user determines a temperature state of the photographed object according to a displayed infrared thermal image. Each photographed object has specific requirements of a photographing part, a photographing angle, and a photographing distance, and a thermal image of the photographed object conforming to the requirements presents a specific imaging shape.

Since thermal imaging detection technology is applied, users are always confused of recognition of the imaging shape of the photographed object and control of the photographing distance as the photographing part and photographing angle are correct, which is dependent on subjective ideas and experience of the users. Thus, at present, if the detection quality needs to be ensured, the users need to think at the same time of photographing, thereby slowing a photographing speed. If the speed is accelerated, a key photographing part or defects of the photographed object may be missed, affecting a state assessment effect. Usually the users can achieve the better detection level with practice accumulation for several years. Further, the users adjust a photographing position and dimension of a photographed object by subjective experience, causing thermal images of the same or similar photographed objects to exist differences in an imaging position, an imaging dimension, or an imaging angle each time, and missing the key photographing part. The differences of the thermal images of the photographed objects acquired each time causes that the subsequent analysis needs to be finished artificially (such as setting analyzed areas to which the thermal image of the photographed object corresponds, the analyzed area including several area units of points, lines, and planes, such as area units S01, S02, and S03 of an analyzed area F6 in FIG. 8, numbers, types, positions, and sizes of the area units being different, the final analyzed result may be different, the setting work being complicated). Further, because of the differences, discreteness of data is difficult to control and analyze, and availability of vertical and horizontal analysis and comparison of the data is lower. In addition, the thermal imaging data acquired according to the above may be difficult for subsequent batch processing of a computer.

Recently means for reducing technical difficulty of thermal image photographing and improving the photographing speed are known. For example, a patent with the application number of CN201010221335.8 discloses a thermal imaging device including a visible light imaging part and an infrared imaging part and displaying a photographed visible light image and an infrared thermal image together, which improves observation intuitive of the thermal image, further to reduce working strength of the users. The prior grid lines and crosswise are used to aim, and over-temperature alarm is used for prompting the users to concern over-temperature photographed objects.

However, the above method does not solve the problem. For example, the condition with high temperature is not a defect in electrical equipment, and temperature of parts with hidden dangers may be lower. According to the thermal imaging device in the prior art, even if the users learn a great deal of infrared photographing theory and knowledge of photographed objects, in the infrared detection, lacking effective means, the users still need to depend on subjective experience to select the photographing part, photographing angle, and photographing distance of the photographed object during photographing, with the lower photographing speed, large workload, and omissions.

In addition, since the requirements of the photographing region, angle, and distance are difficult to express, the higher level is hard to assign clear and definite detection quality requirements to the lower level.

Therefore, a thermal imaging device, without depending excessively on experience accumulation and subjective ideas, capable of assisting the users to accurately grasp cognition of the photographing state of the thermal image and the photographing distance of the photographed object, to understand aims and requirements of the infrared detection and to quickly accurately select the photographing part, photographing angle, and photographing distance of the photographed object, is needed, further to guarantee assessment effectiveness and specification of the acquired thermal imaging data, for being beneficial to subsequent processing and operation such as record and analysis. Therefore, the common users can achieve the better photographing level.

BRIEF SUMMARY OF THE INVENTION

This invention provides a thermal imaging device and a thermal image photographing method. According to a specified position in an infrared thermal image, a reference image with a specified dimension, at least reflecting specified morphological characters of a photographed object, and the infrared thermal image acquired by photographing are displayed together. This invention has the following effects. As the reference image with the specified position and the specified dimension, reflecting the specified morphological characters of the photographed object, is displayed in the infrared thermal image, a user can take the reference image as a visual reference for photographing a thermal image of the photographed object, to photograph the photographed object. Since the reference image gives a visual prompt for imaging characters of the thermal image of the photographed object, and the specified dimension of the reference image gives a mark for a expected dimension of the thermal image of the photographed object and indirectly gives a mark for a photographing distance related to the imaging dimension, the photographing quality can be ensured, thereby reducing technical requirements for the users, improving the photographing quality and speed, reducing the working strength, favoring quality of subsequent analysis and record, and facilitating operation.

This invention provides a thermal imaging device including an acquiring part, a reference image determining part, a position determining part, and a display controlling part. The acquiring part is used for continuously acquiring thermal imaging data. The reference image determining part is used for determining constituted data related to a reference image reflecting specified morphological characters of a photographed object, and the determined constituted data is used for acquiring the reference image reflecting the specified morphological characters of the photographed object. The position determining part is used for determining a specified position and a specified dimension of the reference image located in an infrared thermal image. The display controlling part is used for together displaying the reference image with the specified dimension acquired by the determined constituted data and the infrared thermal image generated by the continuously acquired thermal imaging data according to the specified position.

This invention further provides a thermal imaging device including an acquiring part, a reference image determining part, a position determining part, and a synthesizing part. The acquiring part is used for continuously acquiring thermal imaging data. The reference image determining part is used for determining constituted data related to a reference image reflecting specified morphological characters of a photographed object, and the determined constituted data is used for acquiring the reference image reflecting the specified morphological characters of the photographed object. The position determining part is used for determining a specified position and a specified dimension of the reference image located in an infrared thermal image. The synthesizing part is used for continuously synthesizing the infrared thermal image and the reference image to acquire a synthesized image according to the specified position. The infrared thermal image is generated according to the thermal imaging data continuously acquired by the acquiring part, and the reference image is acquired according to the specified dimension and the constituted data determined by the reference image determining part.

This invention further provides a thermal imaging device including an acquiring part, a reference image determining part, a position determining part, and a synthesizing part. The acquiring part is used for continuously acquiring thermal imaging data. The reference image determining part is used for determining constituted data related to a reference image reflecting specified morphological characters of a photographed object, and the determined constituted data is used for acquiring the reference image reflecting the specified morphological characters of the photographed object. The position determining part is used for determining a specified position and a specified dimension of the reference image located in an infrared thermal image. The synthesizing part is used for performing selective pseudo-color processing for the continuously acquired thermal imaging data according to the specified position and the reference image with the specified dimension acquired by the determined constituted data, to acquire a synthesized image reflecting the reference image and the infrared thermal image generated by the thermal imaging data.

This invention further provides a thermal imaging device including an acquiring part, a reference image determining part, a position determining part, and a display controlling part. The acquiring part is used for acquiring thermal imaging data. The reference image determining part is used for determining constituted data related to a reference image reflecting specified morphological characters of a photographed object, and the determined constituted data is used for acquiring the reference image reflecting the specified morphological characters of the photographed object. The position determining part is used for determining a specified position and a specified dimension of the reference image located in an infrared thermal image. The display controlling part is used for together displaying the reference image with the specified dimension acquired by the determined constituted data and the infrared thermal image generated by the thermal imaging data according to the specified position.

This invention provides a thermal image photographing method. The method includes the following steps: 311) an acquiring step, a thermal imaging device acquiring thermal imaging data, 312) a reference image determining step for determining constituted data related to a reference image reflecting specified morphological characters of a photographed object, the determined constituted data being used for acquiring the reference image reflecting the specified morphological characters of the photographed object, 313) a position determining step for determining a specified position and a specified dimension of the reference image acquired by the assigned constituted data and located in an infrared thermal image, 314) a display controlling step for displaying the reference image with the specified dimension acquired by the assigned constituted data and the infrared thermal image generated by the thermal imaging data together according to the specified position and the specified dimension. The constituted data is the data related to the reference image, and the reference image is the image reflecting the morphological characters of the photographed object.

These and other features, aspects, and advantages of the present invention will become better understood with regard to the following description, appended claims, and accompanying drawings.

BRIEF DESCRIPTION OF THE DRAWINGS

FIG. 5 is a schematic diagram showing information of the photographed object and a plurality of types of the constituted data stored in the storage part according to the first embodiment;

FIG. 17 is a schematic diagram showing a self-adaptive display effect after performing a "centering reference image" process for a local contour image;

FIG. 18 is a schematic diagram showing a self-adaptive display effect after performing a "centering reference range" process for the local contour image;

FIG. 19 is a schematic diagram showing information of the photographed object and morphological constituted data stored in the storage part in another way in the second embodiment;

FIG. 20 is a schematic diagram showing information of the photographed object and a plurality of types of the constituted data stored in the storage part in another way in the second embodiment;

FIG. 25 is a schematic diagram showing a setting interface for setting related information of a reference image generated by morphological constituted data in the fourth embodiment;

FIG. 26 is a schematic diagram showing a setting menu of a thermal imaging device in the fifth embodiment;

FIG. 27 is a schematic diagram showing a menu setting interface of object processing in the fifth embodiment;

FIG. 30 is a schematic diagram showing a menu setting interface of the reference image in the fifth embodiment;

FIG. 31 is a schematic diagram showing a menu setting interface of switch in the fifth embodiment;

DETAILED DESCRIPTION OF THE INVENTION

This invention may be further described according to the drawings and embodiments. For better understanding, the following described embodiments do not limit the scope of the invention and can be changed to different forms in the scope of the invention. In the invention, thermal imaging data may be thermal image AD data (such as the data acquired after AD conversion of output signals of an infrared detector), image data of an infrared thermal image, array data of temperature values, or other data generated based on the thermal image AD data. From the first embodiment to the fifth embodiment, the thermal imaging data is taken the thermal image AD data as an example, and a photographing part is as an example of an acquiring part. In the sixth embodiment, the thermal imaging data is taken compressed thermal image AD data or image data of compressed infrared thermal images as an example, and a communication interface is as an example of an acquiring part.

Figure 1:
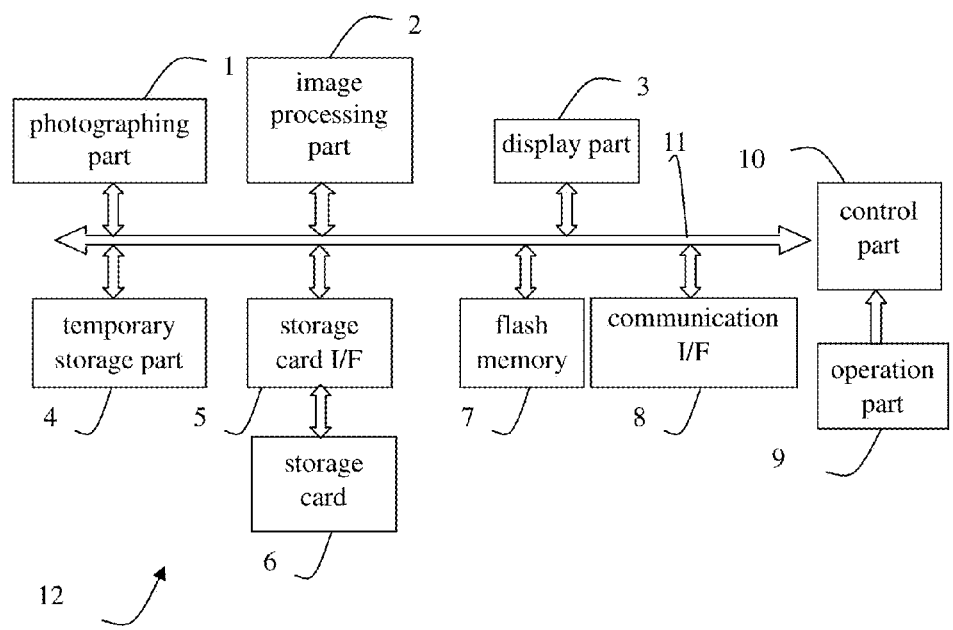
FIG. 1 is a block diagram showing a thermal imaging device in a first embodiment to a fifth embodiment.
Figure 2:
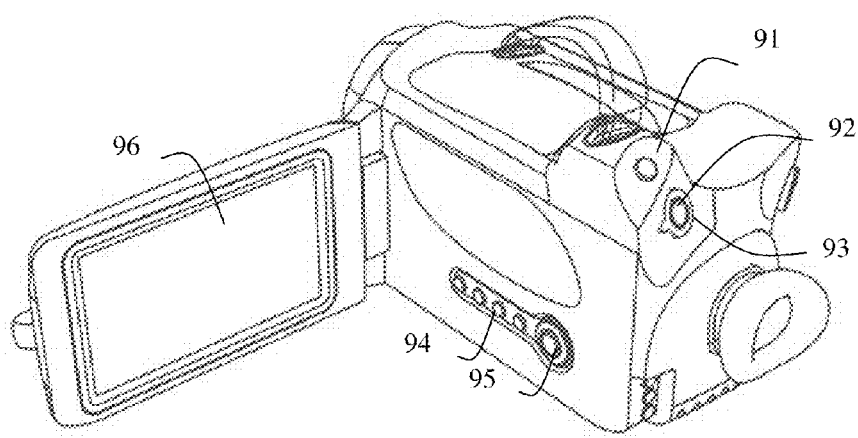
FIG. 2 is an outline diagram showing the thermal imaging device in the embodiments.

The first embodiment is described in detail according to FIG. 1. FIG. 1 is a block diagram showing a thermal imaging device 12 in the embodiments. FIG. 2 is an outline diagram showing the thermal imaging device 12 in the embodiments.

The thermal imaging device 12 includes a photographing part 1, an image processing part 2, a display part 3, a temporary storage part 4, a storage card I/F 5, a storage card 6, a flash memory 7, a communication I/F 8, an operation part 9, and a control part 10. The control part 10 is connected with each other part via a control and data bus 11, and is responsible for overall control of the thermal imaging device 12. The control part 10 may be realized by a CPU, a MPU, a SOC, or a programmable FPGA.

The photographing part 1 includes an optical part, a driving part, an infrared detector, and a signal preprocessing circuit, which are not shown. The optical part is composed of infrared optical lenses, and is used for focusing received infrared radiation on the infrared detector. The driving part drives the lenses to perform focusing or zooming operation according to a control signal of the control part 10, and the optical part may also be manually regulated. The infrared detector, such as a refrigerating or non-refrigerated infrared focal plane detector, converts the infrared radiation passing through the optical part to electrical signals. The signal preprocessing circuit includes a sample circuit, an AD conversion circuit, and a timing trigger circuit, and performs signal processing such as sampling for the signals read from the infrared detector in a specified period. The signals are converted to digital thermal imaging data by the AD conversion circuit. The thermal imaging data may be 14-bit or 16-bit binary data (also called AD value). The thermal imaging data is temporarily stored in the temporary storage part 4. In the embodiment, the photographing part 1 is as an example of an acquiring part, and is used for photographing a photographed object to acquire the thermal imaging data (frame).

The image processing part 2 is used for performing specified processing for the thermal imaging data acquired by the photographing part 1. The image processing part 2 performs processing for converting data to be suitable for displaying or recording, such as modification, interpolation, pseudo-color, synthesis, compression, or decompression.

For example, based on a record instruction of the control part 10, the image processing part 2 is used for performing specified compression for the thermal imaging data to acquire compressed thermal imaging data, and then the thermal imaging data is record to a storage medium such as the storage card 6. In addition, based on the control of the control part 10, the image processing part 2 performs different processing related to image processing, such as increasing and decreasing pixels to change the dimension of the image data, or cutting of the image data. The image processing part 2 may be realized by a DSP, other microprocessors, or a programmable FPGA, or the image processing part 2 may also be integrally formed with the control part 10.

In the embodiment, the image processing part 2 is as an example of a synthesizing part, and is used for continuously synthesizing the infrared thermal image, generated by the thermal imaging data photographed by the photographing part according to the specified position, and the reference image, acquired from the constituted data determined by the reference image determining part according to the specified dimension, to acquire a synthesized image. The synthesized processing allows the displayed synthesized image (displayed by the display part 3) to present the thermal image of the photographed object and the reference image with the specified position and specified dimension and reflecting the specified morphological characters of the photographed object together.

The image processing part 2 is used for performing specified processing, such as pseudo-color processing, for the thermal imaging data acquired by the photographing part 1 to acquire the infrared thermal image, or the image processing part 2 performs the specified processing, such as non-uniformity correction or interpolation, for the thermal imaging data acquired by the photographing part 1 and performs the pseudo-color processing for the thermal imaging data after the specified processing. As to the pseudo-color processing in detail, a corresponding range of a pseudo-color plate may be determined according to a range of AD values of the thermal imaging data or a setting range of the AD values, and the particular color value to which each AD value of the thermal imaging data corresponds in the range of the pseudo-color plate is used as the image data of the corresponding pixel position in the infrared thermal image. In the embodiment, gray scaling for the infrared image may be as a special example of the pseudo-color processing.

According to one embodiment of the synthesized processing, in detail, according to the specified position, the infrared thermal image and the reference image with the specified dimension may be continuously synthesized in a specified transparency ratio, to allow the acquired synthesized image to present the thermal image of the photographed object and the reference image with the specified position and the specified dimension and reflecting the specified morphological characters of the photographed object together.

The transparency ratio represents the ratio of image data of the reference image and the background (infrared thermal image) image during synthesis in the corresponding pixel of the synthesized image. In the synthesized pixels, the sum of the transparency ratio of the reference image and the infrared thermal image is usually one (when pluralities of images overlap, there are specified transparency ratios, respectively, and the sum is usually one). Aiming at all overlapped pixel points of the reference image and the infrared thermal image, the image data of the synthesized overlapped pixel points may be acquired according to the formula "the synthesized pixel=the image data of the reference image×the transparency ratio of the reference image+the image data of the infrared thermal image×(1−the transparency ratio of the reference image)". For example, when the transparency ratio of the reference image is one, and the transparency ratio of the infrared thermal image is zero, the image data of the pixels of the reference image in a corresponding position replaces the image data of the pixels of the infrared thermal image in the corresponding position, which represents that the image of the infrared thermal image in the corresponding position is totally shaded. When the transparency ratios are equal, the image data added by the image data of the two images with the equal ratio is used as the image data of the pixel of the synthesized image. In the synthesized image, the reference image is semitransparent, and the infrared thermal image can by displayed through the reference image, or the reference image can be displayed through the infrared thermal image. The specified transparency ratio may be a default value stored in the thermal imaging device 12, may be set by a user through the operation part 9, or may be stored in the attribute of the constituted data related with the reference image.

When there are a plurality of synthesized objects (the reference image includes a plurality of synthesized objects) for synthesizing with the background (such as, the infrared thermal image), according to the synthesized order of each synthesized object and the corresponding transparency ratio, the synthesized processing may be gradually performed to acquire the final displayed image. For example, when there are a synthesized object 1 (the synthesized order is 1) and the synthesized object 2 (the synthesized order is 2), according to the transparency ratio of the synthesized object 1, the synthesized object 1 is first synthesized with the background (the infrared thermal image) to acquire intermediate data "the image data of the synthesized object 1×the transparency ratio of the synthesized object 1+the image data of the background×(1−the transparency ratio of the synthesized object 1)", and then the synthesized object 2 is further synthesized with the intermediate data according to the transparency ratio of the synthesized object 2, that is, the acquired synthesized pixel is obtained according to the formula, the synthesized object 2×the transparency ratio of the synthesized object 2+the intermediate data×(1−the transparency ratio of the synthesized object 2).

In addition, according to the specified threshold range and the corresponding specified transparency ratio, the corresponding transparency ratio of the image data of the reference image or the infrared thermal image located in the threshold range can be determined. The specified threshold range and the specified transparency ratio may be prestored, or may be set and adjusted by users. The threshold range may be an AD value range, a temperature band (value) range, a gray scale range, or a color range. For example, when the constituted data of the reference image is the thermal imaging data, the corresponding transparency ratio of the threshold range (such as the AD value range or the temperature band range) of the thermal imaging data is used to determine which part of the thermal imaging data of the reference image to generate the image data for displaying in the synthesized image during synthesis (for example, the specified transparency ratio of the image data generated by the thermal imaging data in the threshold range is one, and others are zero). Otherwise, the threshold range (such as the AD range or the temperature band range) of the photographed thermal imaging data may also be used to determine which part of the thermal imaging data of the infrared thermal image to generate the image data for displaying in the synthesized image (for example, the specified transparency ratio of the image data generated by the thermal imaging data in the threshold range is one, and others are zero), to prevent the important part (in the threshold range) of the infrared thermal image from shading. In the embodiment, the transparency ratio of the reference image may also be a changeable value.

According to another embodiment of the synthesized processing of the infrared thermal image and the reference image, the image processing part 2 as the synthesizing part performs selective pseudo-color processing for the thermal imaging data acquired by photographing, according to a corresponding pixel position of the reference image with the specified position and specified dimension in the infrared thermal image, to acquire the synthesized image. In detail, taking the image data of the reference image in the corresponding pixel position as the image data of the synthesized image in the pixel position for example, the pseudo-color processing is not performed for the thermal imaging data in the corresponding pixel position, and the pseudo-color processing is performed for the thermal imaging data except the pixel position of the reference image to acquire the image data of the infrared thermal image, thus to generate the synthesized image. For example, the pseudo-color processing for the thermal imaging data of the pixel position of the thermal imaging data corresponding to the reference image may be different from that for the thermal imaging data of other pixel positions, such as pseudo-color processing of different pseudo-color plates. The pseudo-color processing may be performed after a specified value is taken away from the thermal imaging data of the pixel position in the thermal imaging data corresponding to the reference image, thus to generate the synthesized image. The processing speed can be accelerated, and the reference image with a line pattern is suitable. To the reference image which needs to synthesize in this way, corresponding type information or marks can be attached in the attribute of the constituted data.

A display controlling part (the control part 10) preferably allows the display part to display the synthesized image acquired from the above processing mode or several processing modes, thus to together display the reference image with the specified dimension acquired by the determined constituted data and the infrared thermal image generated by the continuously acquired thermal imaging data according to the specified position. However, the invention is not limited thereto. For example, based on a specified display device, the reference image may also be projected on the infrared thermal image for displaying together. At this moment, the functions of the synthesized processing of the image processing part 2 can be removed.

The display part 3 includes a display driving circuit and a liquid crystal display. Under the control of the control part 10, the display driving circuit drives the liquid crystal display to continuously display the photographed infrared thermal image in a photographing stand-by mode, to continuously display the synthesized image in a reference processing mode, and to display the infrared thermal image read and expanded from the storage card 6 in a reproduction mode. In addition, different setting information can be displayed according to the control of the control part 10. In the embodiment, the display part 3 is as an example of the display part. However, the invention is not limited. The display part 3 may also be other display devices connected with the thermal imaging device 12, and the thermal imaging device 12 may not include a display device in itself.

The temporary storage part 4, such as a RAM or DRAM volatile storage, is a buffer storage for temporarily storing the thermal imaging data output from the photographing part 1, and is a working storage of the image processing part 2 and the control part 10 for temporarily storing the processed data of the image processing part 2 and the control part 10. However, the invention is not limited. The storage or register in the processor such as the control part 10 or the image processing part 2 may also be defined as a temporary storage medium.

The storage card I/F 5 is used as an interface of the storage card 6. The storage card I/F 5 is connected with the storage card 6 as a rewritable nonvolatile storage, which can be detachably installed in a groove of the main body of the thermal imaging device 12 and can record the data such as the thermal imaging data according to the control of the control part 10.

The flash memory 7 (build-in a flash memory) in the embodiment is as an example of the storage part, and is used for storing the constituted data at least related to the reference image reflecting the specified morphological characters of the photographed object. The stored constituted data at least includes morphological constituted data. That is, the stored constituted data is the morphological constituted data, or the stored constituted data includes the morphological constituted data and other constituted data (called auxiliary constituted data in the following text).

In the embodiment, the storage part may be a storage medium of the thermal imaging device 12, for example a nonvolatile storage medium such as the flash memory 7 or the storage card 6, or a volatile storage medium such as the temporary storage part 4, or may be other storage mediums wiredly or wirelessly connected with the thermal imaging device 12, for example other devices wiredly or wirelessly connected with the communication I/F 8, such as the storage medium of other storage devices, the thermal imaging device, or computers, or the storage medium of the network destination. Preferably, the data such as the constituted data is prestored in the thermal imaging device 12 or in the nonvolatile storage medium connected with the thermal imaging device 12.

Figures 3, 4:
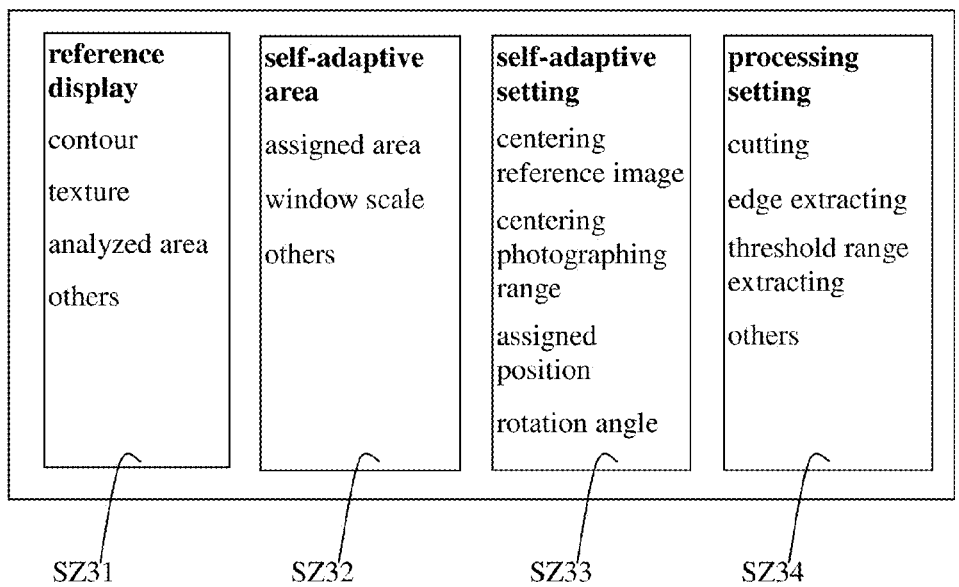
FIG. 3 is a schematic diagram showing a menu setting interface of the thermal imaging device in the first embodiment to the fourth embodiment.
FIG. 4 is a schematic diagram showing information of a photographed object and morphological constituted data stored in a storage part according to the first embodiment.

In FIG. 4, one embodiment of the constituted data stored in the storage part is described, that is, information of a plurality of photographed objects and the morphological constituted data related to the information of each photographed object is stored. The information of the photographed objects, the morphological constituted data related to the information of the photographed objects, the position information (such as a position, a dimension, or a rotating angle) of the image generated by the morphological constituted data located in the infrared thermal image is included. For example, when the stored morphological constituted data is composed of coordinates of a plurality of points, the dimension of the reference image is also stored, and the stored coordinates of the points determine the dimension of the reference image formed by the points. In a similar way, when the position determining part determines the position of the points composing the reference image in the infrared thermal image, the specified dimension of the reference image is also determined. The information of the photographed object may be a type, a name, a number, a place, which represents the identity of the photographed object, or a combination thereof. In addition, the detailed expression form of the position information may also be position parameters (located in the display window of the infrared thermal image) in a coordinate system of the whole picture (for example, when the picture includes the display window of the infrared thermal image and the display window of other information located outside of the display window of the infrared thermal image) in the display part.

The morphological constituted data is the constituted data representing the image of the specified morphological characters of the photographed object, and may be lattice data, vector image data, or the data composed of the lattice data and the vector image data. In the embodiment, the lattice data may be lattice image data, such as the lattice data composed by array data like the thermal imaging data. The morphological constituted data may be acquired from different kinds of images of the photographed object, such as the infrared thermal image or visible thermal image, acquired according to a specified photographing angle or a photographing position, or may be prestored in the storage part (such as the flash memory 7). The reference image can correspond to the specified morphological characters of the whole or part (such as a local contour image T17 in FIG. 18) of the photographed object.

Figure 6:
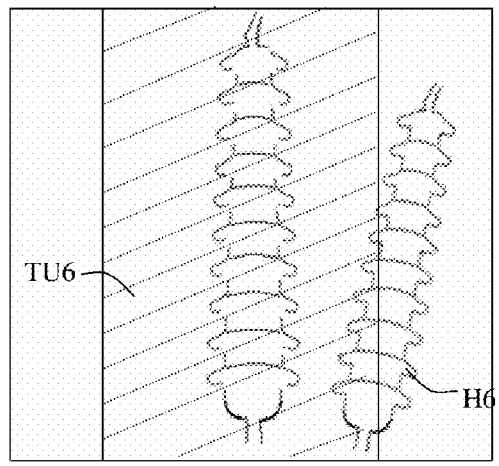
FIG. 6 is a schematic diagram showing a synthesized image with a reference image formed by a visible light image.

The reference image reflecting the specified morphological characters of the photographed object may reflect the specified morphological characters of the thermal image of the photographed object, such as the infrared thermal image including the thermal image of the photographed object. However, the invention is not limited. Since other types of images such as the visible light image and ultraviolet image of the photographed object have similarity of contour and texture or reference in cooperative use with the infrared thermal image, the reference image further may be different types of the images of the photographed object, such as the visible light image or images of the photographed object drew in advance, reflecting the specified morphological characters. After synthesis, the image is semitransparent in the synthesized image according to the specified transparency ratio, which provides a visual reference using morphology of the photographed object representing the specified photographing angle and the photographing position as the photographing reference. In FIG. 6, the reference image TU6 as the visible light image is semitransparent, semitransparently shading the part of the thermal image H6 of the photographed object located in the semitransparent reference image TU6. Although the observation effect may be affected, the reference image is livelier and is convenient for understanding.

Figure 7:
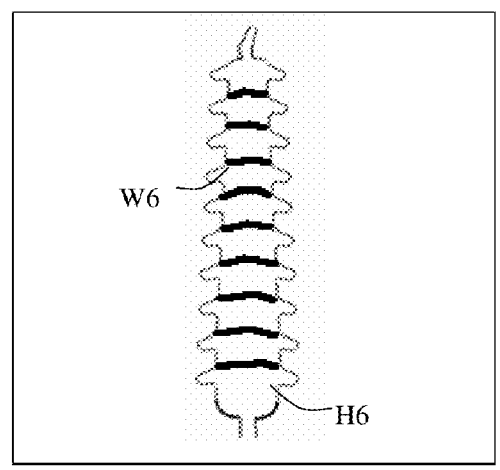
FIG. 7 is a schematic diagram showing a synthesized image with a reference image formed by a texture image.

The reference image reflecting the specified morphological characters of the photographed object may be the image only reflecting the contour and/or texture character of the photographed object. The pixel position of the reference image in the synthesized image indicates the contour and/or texture character related to the morphology of the photographed object, and other positions of the synthesized image can show the infrared thermal image without shading and reducing shade of the thermal image of the photographed object. For example, the contour image T6 in FIG. 8 may only shade the infrared thermal image at the pixel position of the contour image T6, without shading the infrared thermal image at other positions. The morphological constituted data may be vector image data (such as the contour image T6 in FIG. 8) or lattice data (such as the texture image W6 in FIG. 7), and other pixel positions except the contour and/or texture character positions in the reference image can transparently show the infrared thermal image. The reference image can be opaque or semitransparent.

Figure 8:
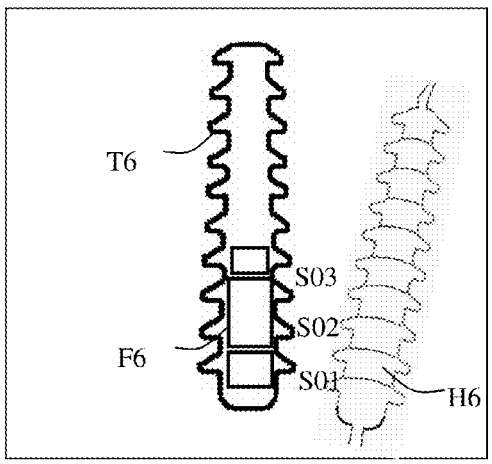
FIG. 8 is a schematic diagram showing a synthesized image with a referenced image formed by a contour image and an analyzed area image.
Figure 9:
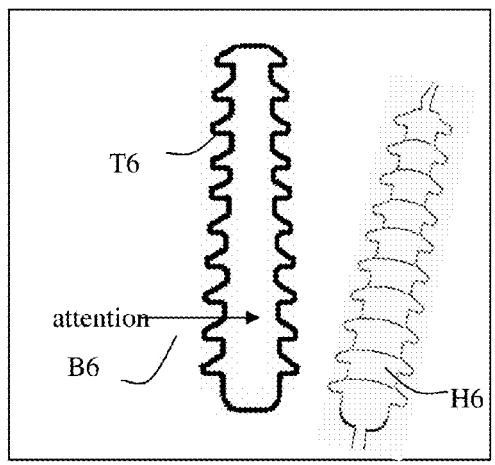
FIG. 9 is a schematic diagram showing a synthesized image with a reference image formed by a contour image and an instruction mark.

The reference image reflecting the specified morphological characters of the photographed object may also include other prompting images as an auxiliary, such as an analyzed area F6 (the analyzed area F6 is composed of three frame analyzed area units numbered as S01, S02, and S03) representing a key observation area in FIG. 8 or a prompting mark B6 representing photographing in FIG. 9, for prompting users to observe corresponding key interested parts of the reference image. For example, although the morphological constituted data can acquire the reference image including the analyzed area F6 and the contour image T6 in FIG. 8, in one preferable embodiment, the morphological constituted data (acquiring the contour image T6) and auxiliary constituted data (such as acquiring the constituted data of the analyzed area) can be used for acquiring the reference image (including the analyzed area F6 and the contour image T6) in FIG. 8 together, thereby promoting the reference effect of the contour image T6 and avoiding disadvantages of the weak reference of the single auxiliary image F6. In the embodiment, the auxiliary constituted data may be vector image data, lattice data, or including the vector image data and the lattice data together, such as for acquiring the analyzed area in FIG. 8 or the prompting mark in FIG. 9. The analyzed area may be a point, a line, or a plane, and in actual, the analyzed area may include one or more analyzed area units (points, lines, planes) and number information of the analyzed area units. The constituted data of the analyzed area for acquiring the analyzed area may include the vector image data of the area units and the number information of the area units. The constituted data related to the reference image may be different types of morphological constituted data and auxiliary constituted data, and the constituted data for acquiring the reference image may be one or more, including at least the morphological constituted data.

In addition, the specified auxiliary constituted data may also be used for specifying the position parameter of the reference image in the infrared thermal image, such as setting the auxiliary object acquired by the auxiliary constituted data as a reference range area, representing the area represented by the auxiliary object as key observation. In addition, the specified auxiliary constituted data, such as the data of the point, line, and plane with specified relative position relation of the reference image, is relatively stored with thermal imaging data during recording and processing. Since the data size of the morphological constituted data is larger, recording the auxiliary constituted data of the auxiliary object with specified relative position relation of the reference image can reduce the stored data size. When the object acquired by the auxiliary constituted data represents the analyzed area, the recording mode is benefit for subsequent batch processing.

A storage part according to another storage embodiment in FIG. 5, stores information of a plurality of photographed objects and the constituted data related to a plurality of types of the reference image with type information related to the information of each photographed object, including a plurality types of the morphological constituted data and the auxiliary constituted data (such as the constituted data of the analyzed area) and the position information (such as a position, a dimension, or a rotating angle) of the image generated by the constituted data in the infrared thermal image. When the auxiliary constituted data is a single point (for example the analyzed area is a single point), the position is only stored. The constituted data can be used for composing the image of different reference types, and is convenient for switching in use, thus to balance between the better reference effect and the shading for the infrared thermal image.

The type information indicates types of different constituted data, and the type can be classified according to reference characters, photographing measurement purposes, or data formats of the constituted data. In one classifying embodiment, the reference character is used for classifying. A user can set the specified determined type of the constituted data for generating the reference image in a menu setting bar SZ31 in FIG. 3 and can set the constituted data related with the reference image as one or more types of the morphological constituted data such as the contour, the texture, or others (such as visible light or infrared thermal image), in addition, further including the constituted data of the analyzed area. When multiple options are set, the reference type of the reference image generated by the multiple constituted data is represented. For example, when the contour and texture are selected, the reference image includes the contour image and the texture image, and when the contour and the analyzed area are selected, the reference image includes the contour image and the analyzed area. The set determined type can be stored as a default value of the specified determined type. Obviously, classifying is not limited to the single constituted data, and can be for combination of multiple constituted data.

In FIG. 4, one storage embodiment of the morphological constituted data related to information of one photographed object is shown. In FIG. 5, one storage embodiment of a plurality of types of the constituted data related to information of one photographed object is shown. Information of parts of different photographed objects (such as the photographed objects with the same model) related to the same constituted data such as the morphological constituted data is also presented. In the storage embodiment shown in FIG. 5, the type information may not be attached, which can be selected by users. The storage contents in FIG. 4 and FIG. 5 can be stored in several documents, such as a data document of the morphological constituted data with a document name of the information of the photographed object, or further using files to classify the documents. The storage contents in FIG. 4 or FIG. 5 may be stored in a data base or a data document with a specified form. The constituted data related to the information of the photographed object may be the constituted data directly related to the information of the photographed object, may be certain constituted data directly related to the information of the photographed object and also related to other constituted data which is related to the information of the photographed object, or may be the constituted data to which the index information of the constituted data related to the information of the photographed object corresponds and related to the information of the photographed object. In addition, if the related mode is by the index information (such as a document name) of the morphological constituted data stored in tables in FIG. 4 or FIG. 5, the morphological constituted data corresponding to the index information (such as the document name) is further stored in the storage medium. In an infrared detection scene, there are a large number of different photographed objects with the same shape, the morphological constituted data is stored in the related mode of the information of the photographed object and the morphological constituted data, which is convenient for users to select information of the photographed object according to the acknowledge on site of the photographed object, further to avoid mistakes of the selection of the constituted data and to reduce data redundancy.

The communication I/F 8 may be an interface for connecting the thermal imaging device 12 and an external device and for exchanging data according to communication specification such as USB, 1394, or network. The external device may be a personal computer, a server, a PDA (personal digital assistant device), other thermal imaging devices, a visible light photographing device, or a storage device.

The operation part 9 is used for a user to emit an instruction to the thermal imaging device 12 or to input setting information. The operating part 9 may include a record key 91, an enter key 92, a focusing key 93, a mode setting key 94, and a cross key 95 as shown in FIG. 2. However, the invention is not limited thereto. A touch screen 96 or a phonic part may be used for realizing related operation.

The control part 10 (such as a CPU) controls the whole action of the thermal imaging device 12. The storage medium such as the flash memory 7 stores control programs and data for using in control of each part. The structure of the thermal imaging device 12 in the embodiment is not limited, and the technique people in the field can modify the structure to realize the invention.

The control part 10 performs control of multiple modes via the control programs. After the power is on, the interior circuit of the control part 10 is initialized. Then, a standby photographing mode is entered, that is, the photographing part 1 acquires the thermal imaging data, and the image processing part 2 performs specified processing for the thermal imaging data acquired by the photographing part 1, to store in the temporary storage part 4 and to allow the display part 3 to continuously display the infrared thermal image in a dynamic image mode. In the state, the control part 10 performs control and continuously monitors whether other modes are switched according to the predetermined condition or shutdown operation is performed. According to the result, corresponding processing control is performed.

A thermal image photographing method (a reference mode) is described hereinbelow. In the embodiment, the control part 10 is as an example of a reference image determining part, a position determining part, and a display controlling part.

Figure 10:
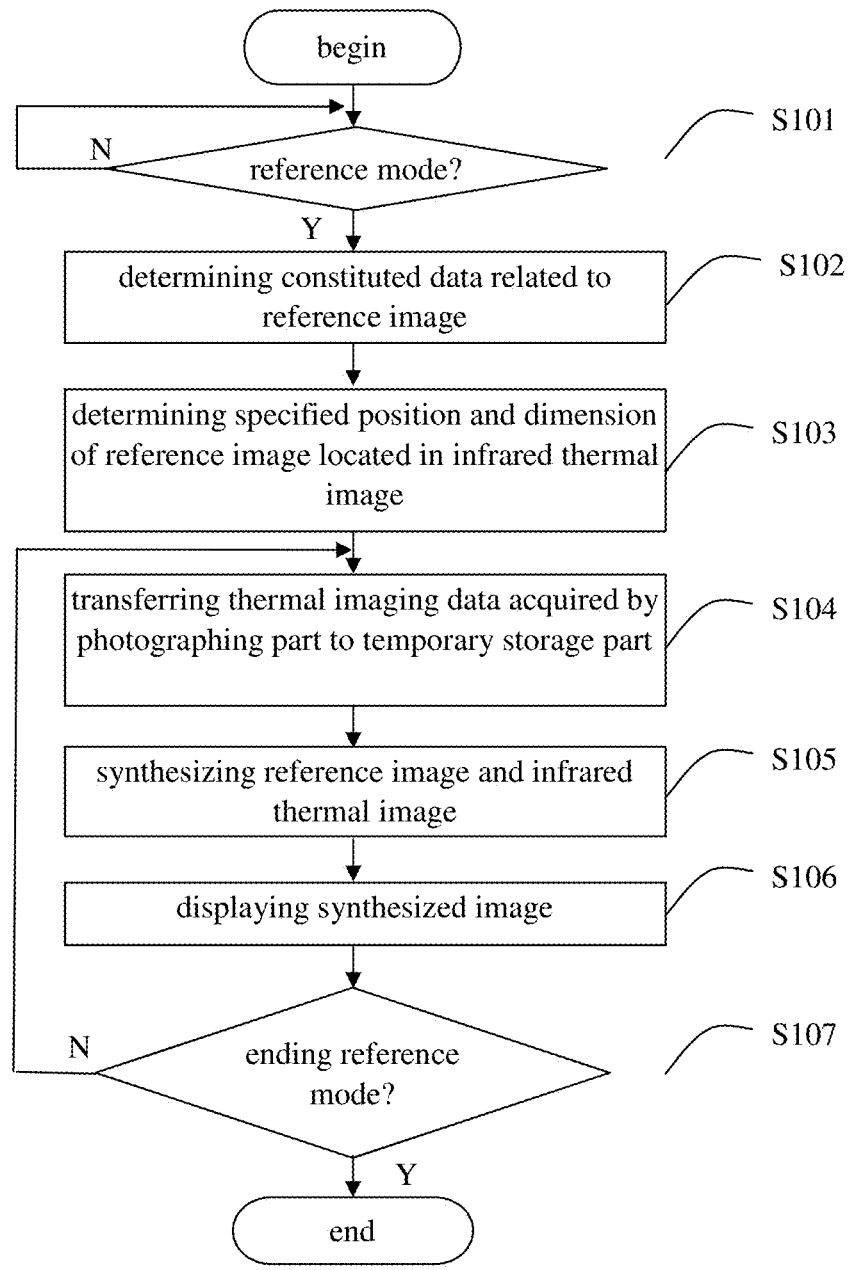
FIG. 10 is a flow chart showing a reference mode in the first embodiment.
Figure 11:
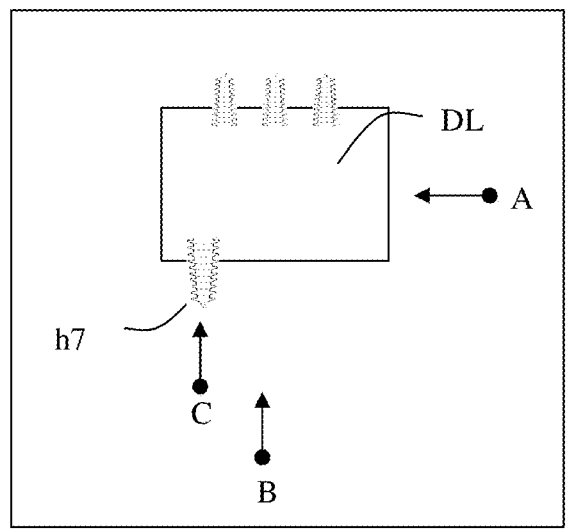
FIG. 11 is a vertical diagram showing a place for photographing a photographed object h7, a photographing position, and a photographing distance of a user in the first embodiment.
Figure 12:
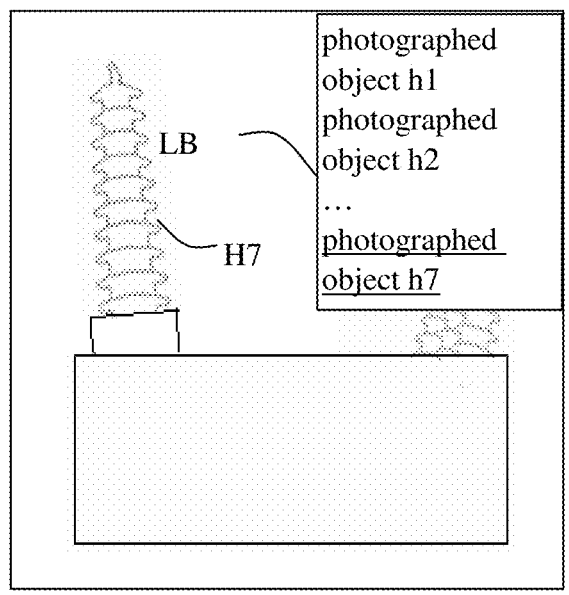
FIG. 12 is a schematic diagram showing a selection interface of options of information of the photographed object of the thermal imaging device in the first embodiment.
Figure 13:
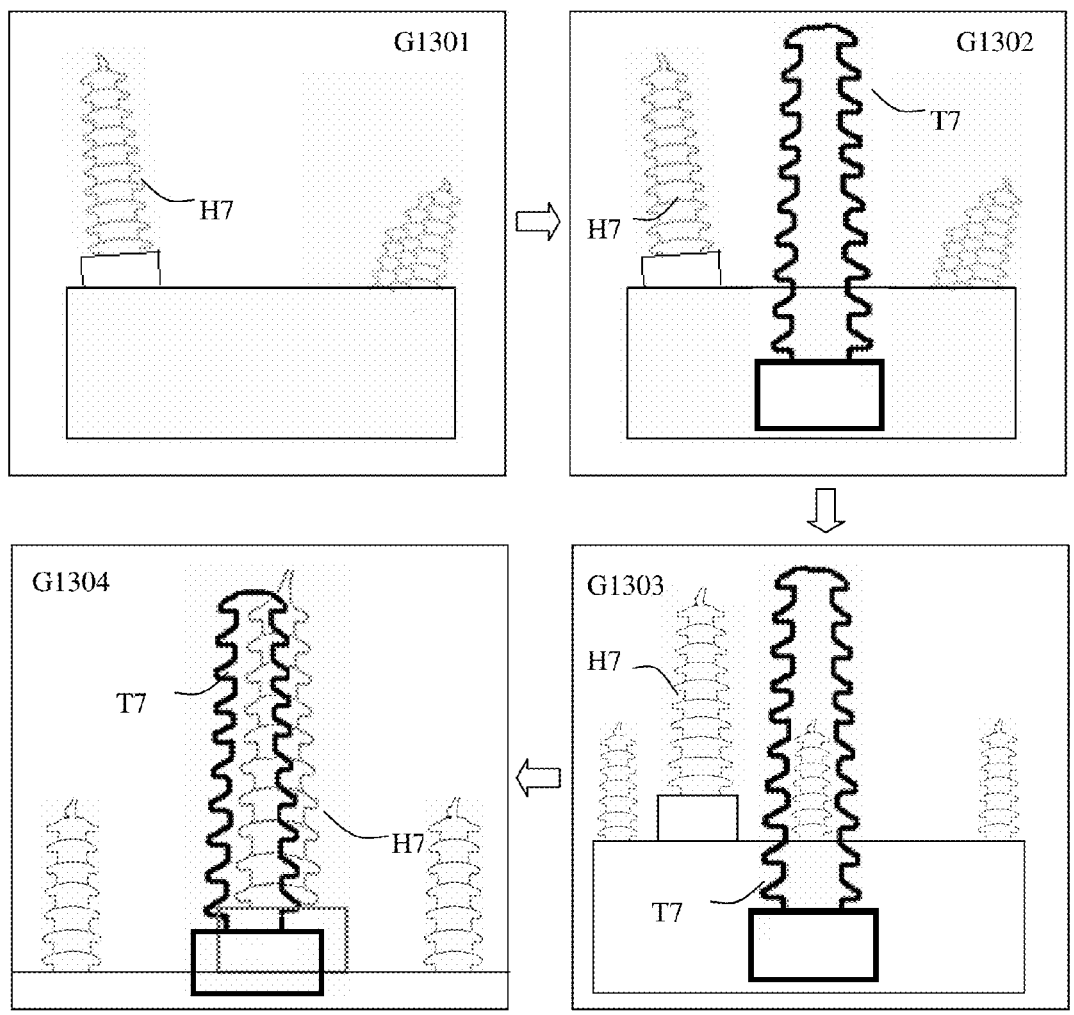
FIG. 13 is a schematic diagram showing a display interface of photographing the photographed object h7 by the reference image in the first embodiment.
Figure 14:
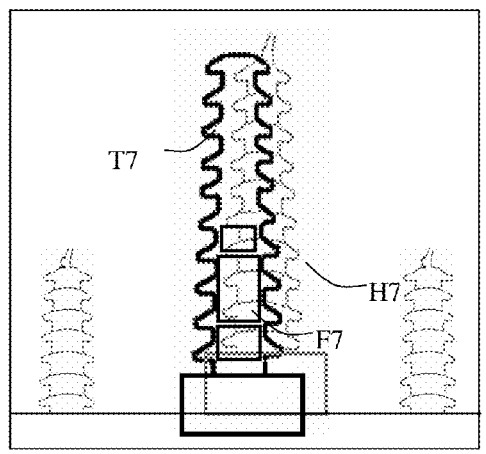
FIG. 14 is a schematic diagram showing a display interface of constituted data for switching the reference image in the first embodiment.
Figure 15:
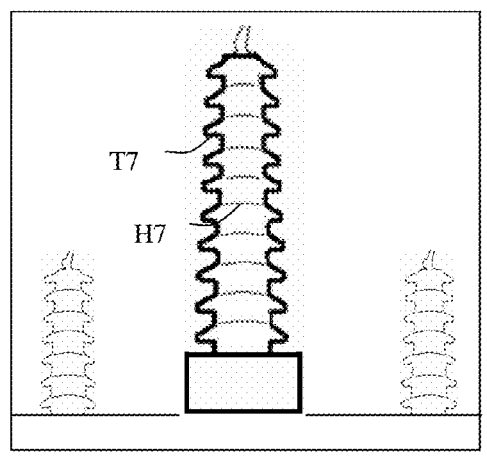
FIG. 15 is a schematic diagram showing a display interface of the reference image matching a thermal image of the photographed object in the first embodiment.

FIG. 10 is a flow chart showing a reference mode. FIG. 11 is a vertical diagram showing a place for photographing a photographed object h7, a photographing position, and a photographing distance of a user. FIG. 12 is a schematic diagram showing a selection interface of options of information of the photographed object of the thermal imaging device. FIG. 13 is a schematic diagram showing a display interface of photographing the photographed object h7 by the reference image. FIG. 14 is a schematic diagram showing a display interface of the constituted data for switching the reference image. FIG. 15 is a schematic diagram showing a display interface of the reference image matching the thermal image of the photographed object. In the embodiment, a scene of infrared detection of power equipment is taken for example, and the objective is to perform patrol photographing for the operation state of the photographed object h7 which is a key part in the power equipment DL. The steps of the reference mode are described as follows.

In step S101, the control part 10 continuously monitors if users select the reference mode. In the standby photographing state, the display part 3 displays the dynamic infrared thermal image. At this moment, the photographing position of the user is a position A in FIG. 11, thus to acquire the infrared thermal image shown in a display interface G1301 in FIG. 13. In the past, the user may be puzzled by the photographing distance, the photographing part of the photographed object h7, or even the photographing part of the photographed object h7 in the power equipment DL. To guarantee the photographing accuracy of the photographed object h7 through the reference of the reference image, and to be simple for operation, the user can select the reference mode to enter into step S102 through the mode key or menu of the operation part 9.

In step S102, the constituted data related to the reference image synthesized with the infrared thermal image is determined. The control part 10 is as the reference image determining part, and is used for determining the constituted data related to the reference image, synthesized with the infrared thermal image and reflecting the specified morphological characters of the photographed object, according to the constituted data stored in the storage part. The determined constituted data at least includes the morphological constituted data. That is, the determined constituted data is the morphological constituted data, or the determined constituted data includes the morphological constituted data and the auxiliary constituted data.

In the embodiment, the flash memory 7 stores the storage content shown in FIG. 4 or FIG. 5, for responding to the operation of the user in the step S101. According to the information of the photographed object stored in the flash memory 7, the control part 10 allows a specified number of options of the photographed object generated according to the information of the photographed object to display on the display part 3, such as an option list LB of the information of the photographed object in FIG. 12. The user finds and selects the "photographed object h7" in the LB via the cross key of the operation part 9 according to acknowledge of the photographed object h7, such as an equipment destination board on site, and presses the enter key. In the embodiment, the control part 10, the operation part 9, and the display part 3 are as an example of a selecting part for selecting the information of the photographed object. According to the operation of the user, the information of the photographed object "photographed object h7" is selected. The information of the photographed object includes a type, a name, a number, a place, which represents the identity of the photographed object, or a combination thereof. Therefore, when the option of the information of the photographed object is a combination of several options, the information of the final photographed object may be determined by selecting from the several options. The expression form of the option of the information of the photographed object may be numbers, words, icons, or graphs. The selecting part is not limited to display the options of the information of the photographed object, and may also select the information of the photographed object by inputting the number of the information of the photographed object.

In one embodiment, the flash memory 7 stores the storage content as shown in FIG. 4 for responding for the operation. The control part 10 determines the vector image data of the contour image T7 as the related constituted data of the reference image synthesized with the infrared thermal image. The control part 10 reads the vector image data of the contour image T7 corresponding to the information of the photographed object "photographed object h7" and the position information of the reference image (the contour image T7) in the infrared thermal image, and transmits the data and the information to the specified area of the temporary storage part 4.

In another embodiment, the flash memory 7 stores the storage content as shown in FIG. 5 for responding the operation. The control part 10 reads the constituted data of the contour image T7, texture image W7, and an analyzed area F7 corresponding to the information of the photographed object "photographed object h7" and the position information of the contour image T7, the texture image W7, the analyzed area F7 in the infrared thermal image, and transmits the data and the information to the temporary storage part 4 for subsequent usage such as switching or recording (the setting needed parts may be transmitted). The control part 10 determines the vector image data of the contour image T7 as the constituted data related to the reference image synthesized with the infrared thermal image, according to the specified determined type of the constituted data as the contour and the type information of the vector image data of the contour image T7. If there is no specified determined type, the constituted data of the contour image T7, texture image W7, and the analyzed area F7 related to the information of the photographed object is together determined for being used as the constituted data generating the reference image, or for reselection of the users. The user can set one or more specified determined types in a menu setting bar SZ31 of the thermal imaging device 12 as shown in FIG. 3.

The invention is not limited thereto. The control part 10 allows the display part to display the selection information related to the constituted data such as the morphological constituted data with a specified number at the specified position, according to the constituted data such as the morphological constituted data stored in the flash memory 7, for selection of the user. The selection information may be words, characters, icons, numbers, codes, or thumbnails, representing the identity information of the constituted data such as the morphological constituted data, and the identity information of the constituted data may be defined or edited with different application meanings. For example, when the storage part stores a plurality of constituted data, the control part 10 may display image thumbnails generated by a specified number of the constituted data for selection of the user, the user may select the image thumbnail suitable for the photographed object according to shapes of the thumbnails, and the constituted data related to the reference image may be determined according to the selection of the user. When the storage medium stores the constituted data as a graph document or an image document, and the reference mode is entered, the control part 10 displays according to the related document name or thumbnail stored in the flash memory 7, for selection of the user. Therefore, information of the photographed object is not necessary, and the storage part may only store the constituted data such as the morphological constituted data.

In addition, the control part 10 as the reference image determining part can be used to determine the constituted data as follows. For example, certain morphological constituted data may be defaulted, and may be used for detecting the specified photographed object. Otherwise, the relationship between the specified key of the operation part and the constituted data such as the specified morphological constituted data may be predetermined, and then the constituted data such as the morphological constituted data may be determined by responding the operation of the specified key.

In addition, after the reference image generated by the determined constituted data and the infrared thermal image are synthesized and displayed, the constituted data related to the present constituted data as the constituted data related to the reference image synthesized with the infrared thermal image after switching is determined by responding the predetermined operation of the user such as switching of the direction keys. The constituted data related to the present constituted data may be related to the present determined constituted data, may be generated according to the present constituted data, or may be other constituted data related to the information of the selected photographed object. For example, the information of the photographed object may be related to a plurality of types of the constituted data, and the switch may be determined in the constituted data.

In addition, according to a predetermined trigger condition such as external trigger signals as induction or GPS signals, the constituted data related to the reference image and corresponding to the signal may be determined, through the trigger of a corresponding receiving device (not shown) of the thermal imaging device.

In addition, for example, the storage medium of the thermal imaging device 12 may store the information of the photographed object, and the constituted data related to the information of the photographed object is stored in an external device, such as a storage device or a computer, wiredly or wirelessly connected through the communication I/F 8. When the user selects the information of the photographed object, the control part 10 sends an instruction to the external device, to acquire and determine the constituted data corresponding to the information of the photographed object in a wired or wireless mode.

In step S103, the specified position and the specified dimension of the reference image in the infrared thermal image are determined.

The control part 10 determines the specified position and the specified dimension of the contour image T7 located in the infrared thermal image according to the position information transmitted to the temporary storage part 4. For example, in FIG. 4, the flash memory 7 stores the morphological constituted data and the position information thereof. The position information represents the specified position and the specified dimension of the reference image generated by the morphological constituted data and located in the infrared thermal image, and the position determining part is used for determining the specified position and the specified dimension represented by the position information as the specified position and the specified dimension of the reference image acquired by the morphological constituted data in the infrared thermal image. In addition, the position, dimension, or rotating angles of the reference image may be determined via input of the user through the operation part, the position determining part sets the specified position and the specified dimension of the reference image according to the default position and the dimension (for example, the center point is default, an original dimension is shown, and the constituted data of the reference image with a suitable dimension may be predetermined), or a specified self-adaptive area is used for determination as described in the second embodiment in detail.

In step S104, the acquired thermal imaging data is transmitted to the temporary storage part 4.

In step S105, the reference image and the infrared thermal image are synthesized. In detail, the control part 10 controls the image processing part 2 to perform corresponding specified processing for the constituted data (the vector image data) of the contour image T7 according to the determined specified dimension or rotating angles, and to synthesize the acquired image data such as the predetermined one-color image data after processing according to the specified position and the image data of the infrared thermal image acquired after specified processing of the thermal imaging data. In the embodiment, the contour image T7 may be semitransparent or opaque.

In step S106, the control part 10 as the display controlling part controls the display part 3 to display the synthesized image as shown in the display interface G1302. That is, the reference image and the infrared thermal image are displayed together, and then step S107 is entered. The contour image T7 provides the better visual reference for users. If there is no reference image for reference, the user fails to subjectively control the shape of the thermal image H7 of the photographed object (in actual, many users only photographed incomplete thermal images of the photographed object or with improper photographing angles), the imaging position, dimension, and angle in the infrared thermal image.

In step S107, the control part 10 performs control and monitors if the user withdraws from the reference mode.

If yes, the reference mode is end. If no, the steps S104 to S106 are repeated. The display part displays the continuously synthesized dynamic infrared thermal image and the reference image, reflecting the continuous synthesized and displayed state of the acquired dynamic infrared thermal image and the reference image T7. For example, in the display interface G1302, there are larger shape differences between the thermal image H7 of the photographed object and the contour image T7. Therefore, the user adjusts the photographing angle of the photographed object h7 according to the reference of the contour image T7, and the photographing position is changed from the photographing position A to the photographing position B in FIG. 11. At that moment, the photographing angle at the photographing position B is shown as the display interface G1303, and the contour shape of the contour image T7 is similar to that of the thermal image H7 of the photographed object. However, there are larger differences between the imaging size of the thermal image H7 of the photographed object and that of the contour image T7. At that moment, the user may understand that the photographing part is the part of the photographed object instructed by the contour image T7 and the imaging position, size and angle of the thermal image of the photographed object in the infrared thermal image is instructed by the contour image T7. Then, by adjusting the photographing distance and the imaging position between the optical part of the thermal imaging device 12 and the photographed object h7, such as changing the photographing position B of the user to the photographing position C in FIG. 11, the thermal image H7 of the photographed object in the display interface G1304 in FIG. 13 acquired after adjustment and the contour image T7 are in a preliminary matching state of the imaging position and size on visual. At that moment, the user can determine the state of the thermal image H7 of the photographed object conforming to the specified shape without missing, or can continuously adjust the photographing position and angle to achieve the visual matching state of the display interface as shown in FIG. 15. If matching, the processing such as analyzing or recording is convenient for acquiring accurate analyzed results. Further, when the analyzed area F7 is related, the manual setting of the analyzed area can be avoided. Further, by recording the information related to the contour image T7, such as the constituted data and position information of the contour image T7, and the relation between the information of the photographed object h7 and the thermal imaging data acquired at that moment, the generated document of the infrared thermal image has the position and size information of the thermal image of the photographed object in the infrared thermal image, which is convenient for subsequent batching analysis and intelligent diagnosis.

When the flash memory 7 stores the storage content as shown in FIG. 5, the user can switch to display the reference image of other types for reference. In detail, the control part 10 responds switching operation of the user, determines the constituted data related to the information of the photographed object or the contour image T7, such as the analyzed area F7 and texture image W7, transmitted to the temporary storage part 4 in the step S102, and synthesizes singly the infrared thermal image or together with the contour image T7 (the reference image of the analyzed area F7 and the contour image T7 are included in FIG. 14), to strengthen the reference effect.

In addition, the position, dimension, or rotating angle of the contour image T7 are adjusted (redefined) to match the thermal image H7 of the photographed object as shown in the display interface G1303.

After the photographed object h7 is detected, the reference mode can be selected again, to enter reference photographing of the next photographed object or to enter other processing modes. If there is no reference mode of the reference image reflecting the specified morphological characters of the photographed object in the infrared photographing, the user needs to subjectively conjecture the photographing angle, distance, and photographing part of the photographed object h7, which is easy to omit key measuring parts and slows the photographing speed.

In addition, the control part 10 further includes a transparent object assigned part, for users to assign the object which needs to change the transparency ratio (such as the reference image T7 in the embodiment) in the reference image displayed by the display part and for responding predetermined operation of the user to change the transparency ratio of the assigned object.

In the first embodiment, since the information of the photographed object and the morphological constituted data related to the information of the photographed object is prestored, the morphological constituted data can be selected conveniently according to the photographed object at the photographing scene. Since the flash memory 7 stores the position information related to the morphological constituted data, the position adjustment of the reference image is avoided, and the operation is simple and standard. Since the reference image with the specified position and the specified dimension and reflecting the contour characters of the photographed object is presented in the synthesized image, a visual reference is provided for the user to photograph the thermal image of the photographed object, and the photographing angle, part, and distance of the photographed object are prompted and specified. Obviously, according to the reference of the reference image, the users are perfectly clear about the photographing requirement, without excessively depending on experience accumulation and subjective consciousness, which can reduce photographing difficulty substantially and improve the detecting quality and speed. Thus, ordinary users can achieve the better photographing level. Further, since the contour morphological constituted data is used to form the reference image, the reference effect is better. The first embodiment is the better embodiment. However, any product for carrying out the embodiment of the invention does not need to achieve all the advantages at the same time.

Figure 16:
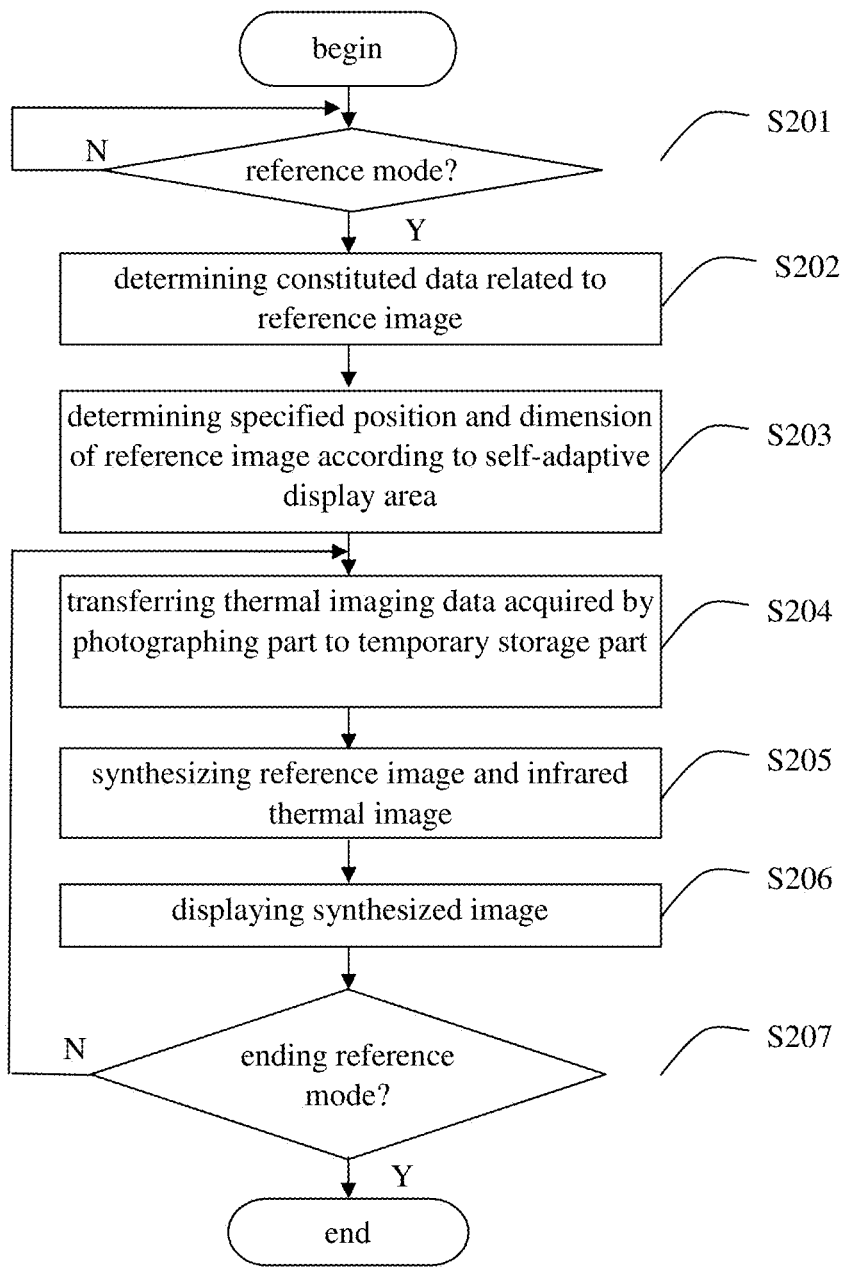
FIG. 16 is a flow chart showing (self-adaptive display) a reference mode in the second embodiment.
Figure 21:
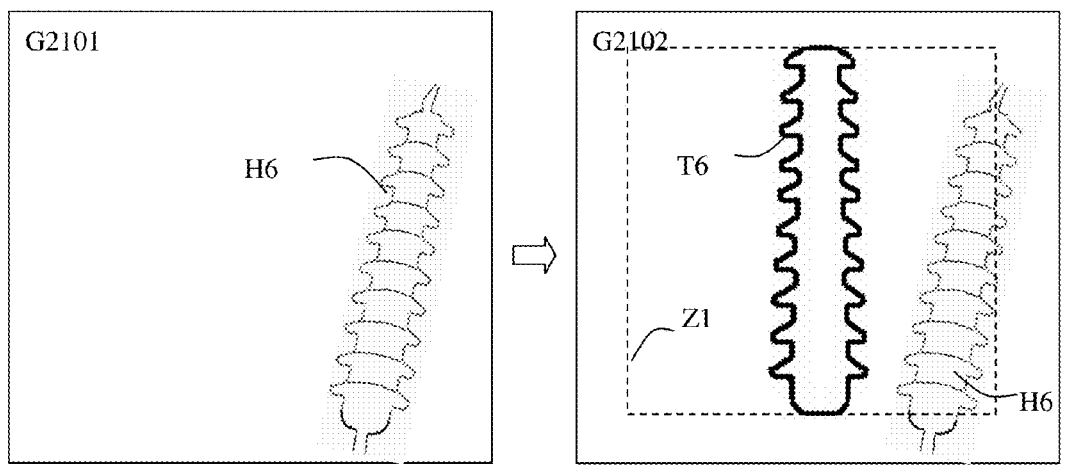
FIG. 21 is a schematic diagram showing a display interface of the self-adaptive display of the determined reference image in the second embodiment.

The difference between the first embodiment and the second embodiment is that in the thermal imaging device 12 with the same structure as shown in FIG. 1, the flash memory 7 stores control programs for allowing the reference image to self-adaptively display in a self-adaptive area in the second embodiment. FIG. 16 is a flow chart showing a (self-adaptive display) reference mode. FIG. 17 is a schematic diagram showing a self-adaptive display effect after performing a "centering reference image" process for a local contour image. FIG. 18 is a schematic diagram showing a self-adaptive display effect after performing a "centering reference range" process for the local contour image. FIG. 19 is a schematic diagram showing the information of the photographed object and the morphological constituted data stored in the storage part in another way. FIG. 20 is a schematic diagram showing the information of the photographed object and a plurality of types of the constituted data stored in the storage part in another way. FIG. 21 is a schematic diagram showing a display interface for determining the reference image to photograph a photographed object h6.

In the embodiment, the control part 10 as the position determining part determines the specified position and the specified dimension of the reference image in the infrared thermal image according to the size and position of the self-adaptive area in the infrared thermal image and the position of the reference image in the self-adaptive area.

The self-adaptive area is the specified area for self-adaptively displaying the reference image in the infrared thermal image, and the self-adaptive display is the non-overflow maximization display with a fixed aspect ratio in the self-adaptive area by the reference image in the specified position of the self-adaptive area. In the embodiment, the angle is unchangeable, while the angle may be changeable.

Usually, the thermal image of the expected photographed object has a specified dimension and is centered, and the self-adaptive area can be convenient for standard displaying the reference image. The self-adaptive area bar SZ32 in FIG. 3 is used for setting the position and dimension of the self-adaptive area in the infrared thermal image, such as a specified scale of a display window of the infrared thermal image or an assigned area in the infrared thermal image. The reference image position bar SZ33 is used for setting the position of the reference image in the self-adaptive area, such as setting "centering reference image" or "centering reference range", which is not limited to the center point, also may be other assigned positions or have rotating angles. When the setting is finished, the setting may be stored as the default self-adaptive setting parameters.

The control part 10 is used for computing the specified position and the specified dimension of the reference image in the infrared thermal image after the reference image is zoomed self-adaptively. For example, the self-adaptive area is set in the center of the infrared thermal image, and the reference image is set "centering reference image" in the self-adaptive area. The control part 10 computes ratios of X-axis and Y-axis between the self-adaptive area (dimension X1, Y1) and the reference image (the dimension X2, Y2 of the reference image before scaling), and selects the smaller one of X1/X2 and Y1/Y2 as a scaling ratio based on a center point of the reference image when the reference image is centered, thus to acquire the specified position and the specified dimension of the self-adaptively displayed reference image located in the infrared thermal image. In FIG. 17, a display effect of "centering reference image" of the local contour image T17 is shown.

In addition, centering the reference image further includes the following condition. When a plurality of types of the constituted data is determined as the constituted data related to the reference image, the control part 10 is used for combining the determined constituted data as a combined object, to acquire a combined reference image and to compute self-adaptively displayed position and dimension of the combined reference image. At this moment, the processing of "centering reference image" may display the combined reference image in center. The image generated by each type of the combination of the constituted data may not be displayed.

However, when the image generated by the constituted data representing the local specified morphological characters of the photographed object is performed "centering reference image" processing, the image (the reference image or part of the reference image) generated by the constituted data may not represent the reference range of the expected photographed object. For example, the reference image in FIG. 17 fails to be used for photographing the photographed object as a whole. To further specify the specified position and specified dimension of the reference image generated by the constituted data in the infrared thermal image, a common reference range area can be set for the image generated by the constituted data. The reference range area, to which the reference image corresponds, represents the displayed reference range of the reference image, and stores the position information (a position, a dimension, or a rotating angle) of the image relative to the reference range area and generated by the constituted data in the plural types of the constituted data corresponding to the same photographed object, thus to allow the image generated by the constituted data to keep the relative position specification with the reference range area. When the reference image has the corresponding reference range area, the processing of "centering reference range" is self-adaptive centering of the reference range area, and the relative position (the position, the dimension, or the rotating angle) between the reference image after self-adaptive processing and the reference range area remains the same.

In one aspect, the application of the reference range area can avoid the condition that the reference image reflecting the local specified morphological characters of the photographed object is too large to be displayed. For example, a bounding rectangle with a complete contour may be used as the reference range area of the reference image of the local contour. In FIG. 18, the displayed effect of "centering reference range" of the local contour image is shown, which is different from "centering reference image" of the local contour image T17 in FIG. 17. In FIG. 18, the local contour image T17 corresponds to the reference range area L17 which may be not displayed. The reference range area may be prestored, may be input by users, may be one type of the constituted data related to the reference image, or may be computed after combining a plurality of types of the constituted data. When the reference image has the corresponding reference range area, the "centering reference range" processing is the self-adaptive centering of the reference range area, and the relative position (the position, the dimension, or the rotating angle) of the processed reference image and the reference range area remains the same. The control part 10 is used for computing the specified position and specified dimension of the reference image located in the infrared thermal image during "centering reference range", first computing ratios of X-axis and Y-axis between the self-adaptive area (dimension X1, Y1) and the reference range area (the dimension X3, Y3 before scaling) and selecting the smaller one of X1/X3 and Y1/Y3 as a scaling ratio based on a center point of the reference range area when the reference range area is self-adaptively centered. Then according to the relative position (the position, the dimension, or the rotating angle) of the reference image (before scaling) in the reference range area (before scaling), the scaling ratio during self-adaptive centering of the reference range area is used as the scaling ratio of the reference image based on the center point of the reference range area, to compute the specified position and specified dimension of the reference image located in the infrared thermal image during the self-adaptive centering of the reference range area.

In another aspect, the key observation part of the users can be used as the reference range area, further to improve the reference effect. For example, the analyzed area may be used as the reference range area. At that moment, although one part of the reference image may be overflowed, the overflow suitable for application needs may be acceptable. Thus, the users can approach the photographed object for photographing, with the reference of the reference image and protecting the photographing quality. The change of different display positions can be realized via changing the reference range area, to realize different photographing aims.

In the embodiment, the storage content in one storage embodiment as shown in FIG. 19 includes the information of the photographed object and the morphological constituted data related to the information of the photographed object, without the position information of the reference image generated by the contour morphological constituted data in the infrared thermal image.

The storage content in another storage embodiment as shown in FIG. 20 includes information of the photographed object, the constituted data with the type information related to the information of the photographed object, and the position information (such as, storing the position, the dimension, or the rotating angle in the contour) of the image (before scaling) acquired by the constituted data relative to the contour (before scaling), that is, the specified relative position relation. The position information of the image generated by the contour morphological constituted data in the infrared thermal image may be stored or not stored. In the embodiment, the bounding rectangle of the contour may be used as the reference range area of the image acquired by other constituted data. In addition, the bounding rectangle of the combined reference image acquired after combining a plurality of the constituted data (such as the constituted data related to the information of the photographed object stored in FIG. 20) is used as the reference range area of the image generated by the constituted data, storing the position and dimension information of the image relative to the reference range area and generated by each of the constituted data of a plurality of the constituted data. Preferably, the storage part (the flash memory 7) stores the constituted data, the reference range area corresponding to the image generated by the constituted data, and the specified relative position relation (such as, storing the position, the dimension, or the rotating angle in the reference range area) of the image generated by the constituted data relative to the reference range area.

According to the embodiment in FIG. 5, the specified relative position relation (also called the specified relative position relation of the constituted data in the following text) of the objects acquired by the constituted data related to the information of the same photographed object is stored. According to the embodiment in FIG. 20, the position information of the objects respectively located in the same reference system (such as in the infrared thermal image) and acquired by the different type of the constituted data related to the information of the same photographed object is stored. However, the invention is not limited thereto. For example, the specified relative position relation of the objects acquired by the constituted data may be set by users, or the specified relative position relation of the objects acquired by the constituted data may be set by a default position rule of the thermal imaging device 12.

A reference photographing process of the self-adaptive area is described hereinbelow, and in the embodiment, the set self-adaptive area Z1 and "centering reference image" are described.

In step S201, in a standby photographing state, the display part displays the dynamic infrared thermal image, such as the display interface G2101 in FIG. 21, and the control part 10 performs control. When the users select the reference mode, step S202 is entered.

In step S202, the constituted data for generating the reference image is determined as the vector image data of the contour image T6. See also the step S102 for the determined processing mode.

In step S203, according to the self-adaptive area, the specified position and specified dimension of the reference image in the infrared thermal image are determined.

The control part 10 as the position determining part, according to the size and position of the self-adaptive area Z1 in the infrared thermal image and the centering position of the contour image T6 in the self-adaptive area Z1, determines the specified position and specified dimension of the contour image T6 in the infrared thermal image.

In step S204, the acquired thermal imaging data is transmitted to the temporary storage part 4.

In step S205, the control part 10 controls the image processing part 2 to perform corresponding processing for the constituted data (the vector image data) of the contour image T6 according to the determined specified dimension and to synthesize the image data of the contour image T6 after processing and the image data acquired by the thermal imaging data after specified processing according to the specified position.

In step S206, the control part 10 as the display controlling part controls the display part 3 to display the synthesized image. In the display interface G2102 in FIG. 21, there is larger shape difference between the thermal image H6 of the photographed object and the contour image T6 in the synthesized image. The user can adjust photographing of the photographed object h6 according to the reference of the contour image T6.

In step S207, the control part 10 performs the control and monitors if the user withdraws from the reference mode. If yes, the reference mode is end. If no, the steps S204 to S206 are repeated.

According to the above, according to the size and position of the specified self-adaptive area in the synthesized image and the position of the reference image in the self-adaptive area, the position and dimension of the reference image displayed in the infrared thermal image are determined. Therefore, display of the reference image is more standard, and the user is convenient for understanding the display of the reference image.

The difference between the third embodiment and the first embodiment is that in the thermal imaging device 12 with the same structure as shown in FIG. 1, the flash memory 7 stores the constituted data related to the reference image by determining the specified thermal imaging data acquired by the photographing part or the infrared thermal image acquired by the thermal imaging data for responding predetermined operation, the morphological constituted data by further processing of the constituted data, or control programs of the acquired reference image in the third embodiment. The thermal image photographing method is described as follows. The processing object assigned part (the control part 10) is used for assigning the processing object. The image handling part (the image processing part 2) is used for performing cutting, edge extracting, or threshold range extracting for the processing object. The storage part (the temporary storage part 4, etc.) is used for storing the morphological constituted data acquired by processing. The reference image determining part (the control part 10) is used for determining the morphological constituted data acquired by processing as the constituted data related to the reference image and synthesized with the infrared thermal image.

Figure 22:
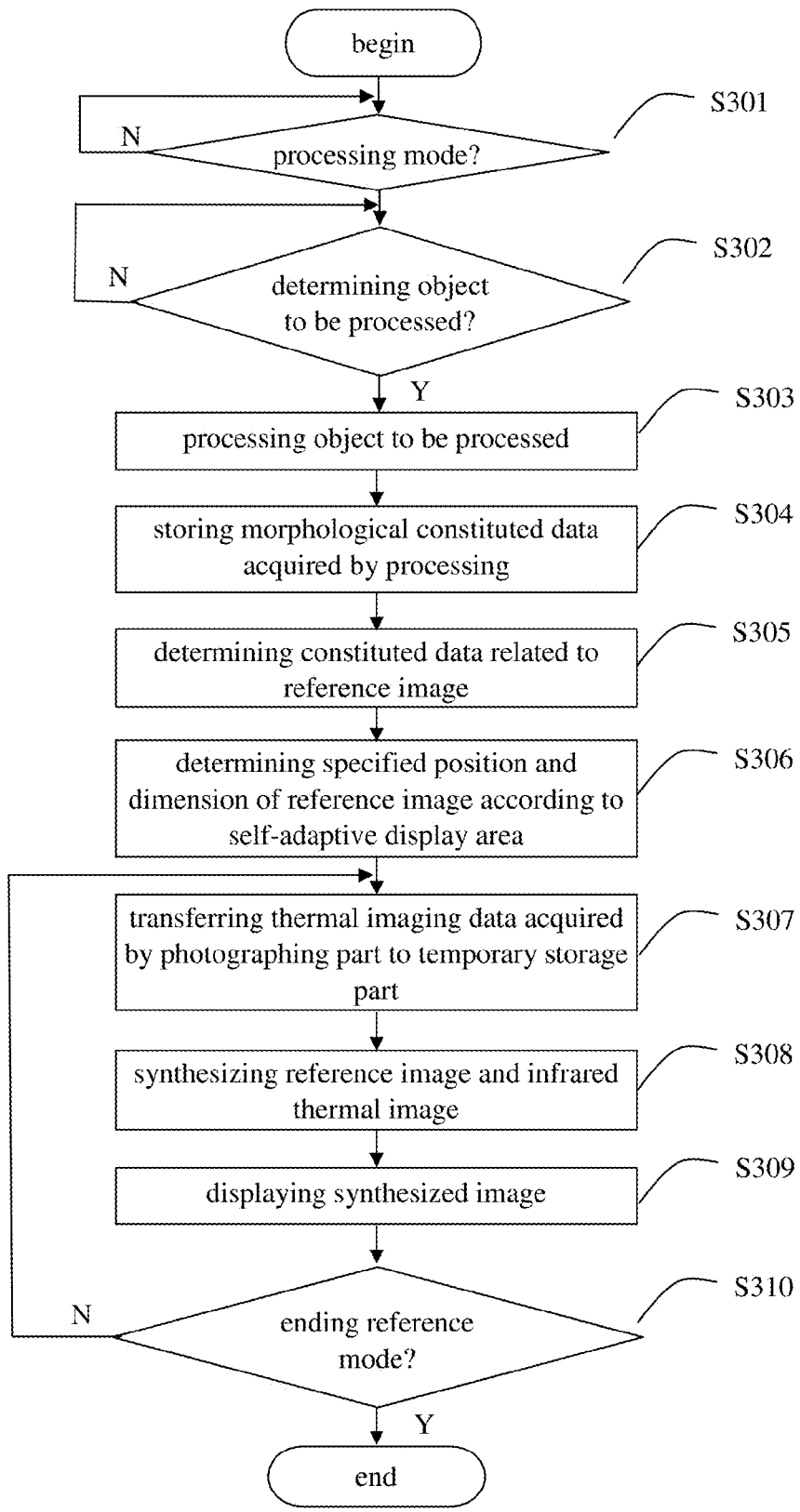
FIG. 22 is a flow chart showing a reference mode in the third embodiment.
Figure 23:
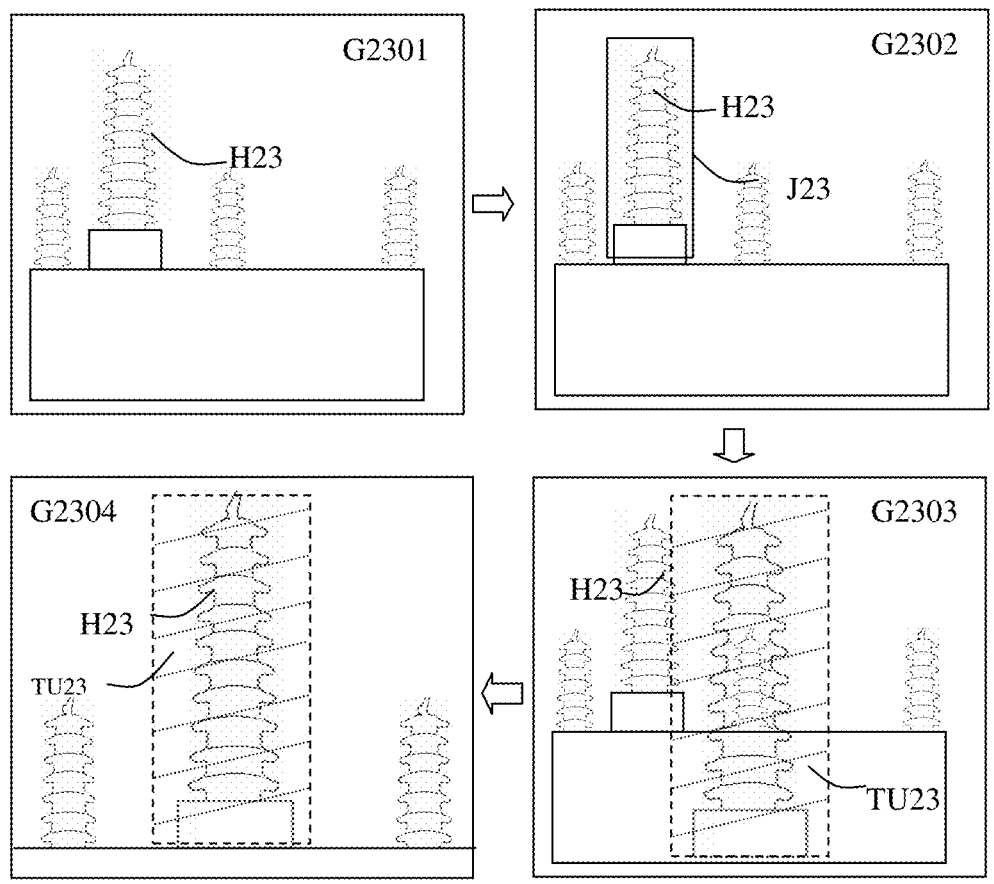
FIG. 23 is a schematic diagram showing a photographing display interface of acquiring morphological constituted data through cutting processing and generating a reference image by the morphological constituted data in the third embodiment.
Figure 24:
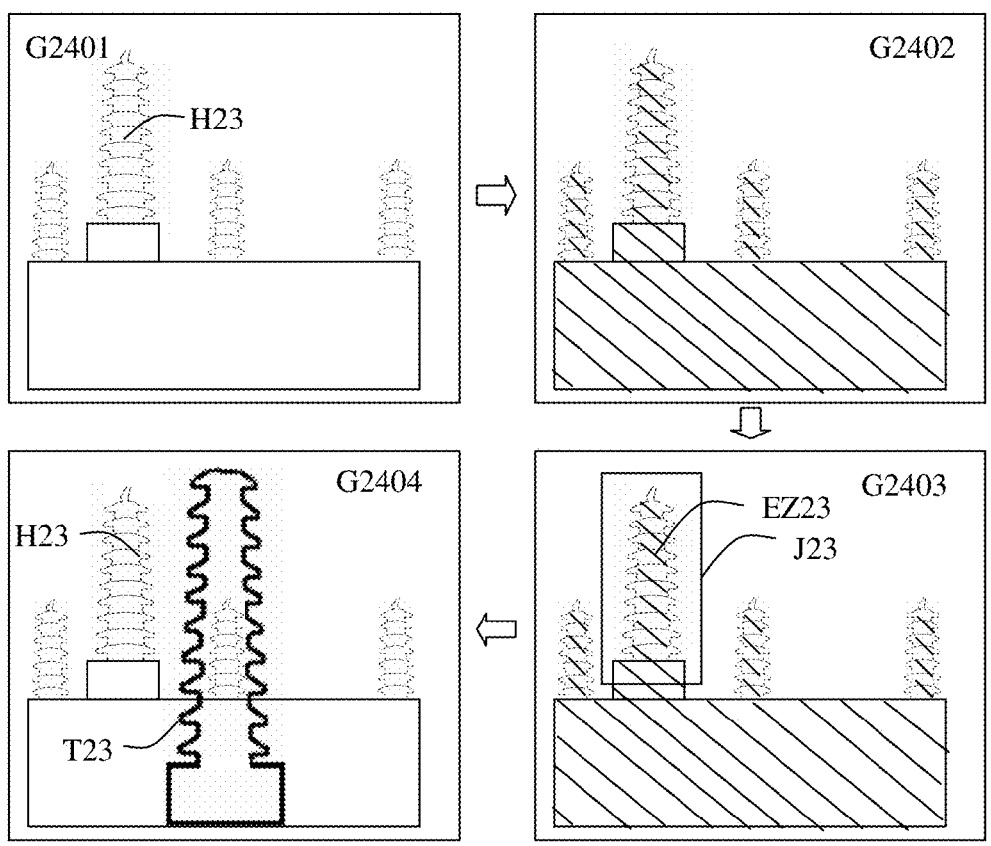
FIG. 24 is a schematic diagram showing a display interface of a process for acquiring the morphological constituted data by edge extracting and generating the reference image in the third embodiment.

FIG. 22 is a flow chart showing a processing reference mode. FIG. 23 is a schematic diagram showing a photographing display interface of acquiring the morphological constituted data through cutting processing and generating the reference image by the morphological constituted data. FIG. 24 is a schematic diagram showing a display interface of a process for acquiring the morphological constituted data by edge extracting and generating the reference image.

This embodiment is based on the following using scene. A higher-level user with rich experience leads several lower-level users to perform infrared detection for a photographed object h23 in a converting station. Different from the first embodiment, the flash memory 7 does not store the morphological constituted data corresponding to the photographed object h23. To make the photographing assignment clear and to protect the detection quality, the higher-lever user uses the thermal imaging device of the lower-lever users to collect the morphological constituted data and transmits the photographing assignment according to the collected data. The control steps in the processing reference photographing are as follows.

In step S301, the display part displays a dynamic infrared thermal image. The control part 10 performs the control and continuously monitors if the user selects a processing mode. At that moment, to the infrared thermal image as shown in the interface G2301 by the display part, in the past, the user may be confused about the photographing distance and angle of the thermal image H23 of the photographed object. The transmitted photographing assignment of the higher-level user is to photograph the photographed object h23 and the photographed object of the same kind. Since the photographed object h23 is a specified part of the power equipment DL, to allow the lower-level users to understand the intention during detection, photographing parts, and photographing distances, the higher-level user selects the cutting processing mode via the mode key of the operation part 9, thus to enter into the step S302. The user can select the processing type at the processing menu setting bar SZ34 in FIG. 3.

In step S302, the control part 10 continuously monitors if the user sends an instruction for assigning a processing object. For responding selection of the cutting processing mode, the control part 10 controls the display part 3 to display a rectangular cutting area J23, and the user adjusts the photographing angle and distance of the photographed object h23 or adjusts the cutting area J23, to expect for acquiring the morphological constituted data or to allow the thermal image H23 of the photographed object of the reference image to be located in the cutting area J23, as shown in G2302. Then, as the enter key is pressed, the control part 10 responds the operation, for example, using an infrared detector to read signals at that time and storing the acquired thermal imaging data to a specified area of the temporary storage part 4, and the control part 10 determines the thermal imaging data or the acquired thermal imaging data after the specified processing as the processing object, then entering the step S303. In the embodiment, the infrared thermal image acquired by the thermal imaging data after the specified processing (such as the pseudo-color processing) is determined as the processing object. As the pseudo-color transformation needs to be performed for the reference image generated by the morphological constituted data acquired by the processing in the subsequence, the thermal imaging data as the processing object is more suitable.

In addition, when the thermal imaging device 12 includes imaging devices (such as a visible camera which is not shown in FIG. 1) of other types, images captured by other imaging devices may be used as the processing object or as the constituted data of the reference image. In addition, the processing object may also be selected from the storage medium. For example, the prestored infrared thermal image, visible images, or other morphological constituted data read from the storage card 6 may be used as the processing object.

In step S303, the processing for the processing object is performed. Based on the control of the control part 10, the image processing part 2 as the image handling part extracts the thermal imaging data in the cutting area J23, and the next step is entered.

The processing may be specified image processing performed for the processing object, such as cutting, character extracting (such as threshold range extracting or edge extracting), enhancement, filtering, pseudo-color, brightness adjusting, color adjusting, or a combination thereof.

The cutting is to extract data of the processing object located in the cutting area (such as the image data or the thermal imaging data).

The threshold range extracting is to extract data of the processing object located in a threshold range (such as extracting a temperature band or a color band regarding the infrared thermal image) according to a specified algorithm. The threshold range may be a set AD value range of the thermal imaging data, a temperature threshold range, a gray-scale range, or a color-code range, and it may be a prestored threshold range or may be set or adjusted by the user according to the displayed infrared thermal image.

The edge extracting is to extract data of the edge contour of the photographed object in the processing object according to a specified algorithm. For example, binaryzation may be performed for the determined processing object according to a specified threshold range. The specified threshold range may be a prestored threshold range or may display a binary image, and the binaryzation threshold range may be set by users. The threshold range may be a set AD value range of the thermal imaging data, a temperature threshold range, a gray-scale range, or a color-code range. Then, a connected region of the image after the binaryzation is processed. Then, an edge detecting processing is performed for the connected region, thus to acquire edge contour data. Further, a vector processing is performed for the acquired edge contour image. For example, the processing object may be the infrared thermal image as shown in G2401 in FIG. 24. First, the infrared thermal image after the binaryzation is shown in G2402 in FIG. 24 (capable of displaying or not displaying). Then, the cutting area J23 is set, as shown in G2403 in FIG. 24, to determine an expected extracted area J23. Further, edge contour data of a binary thermal image EZ23 in G2403 is extracted, and is centered and self-adaptively displayed as the contour image T23 in G2404. Other detailed processing methods may adopt mature methods in the field, and it is not described in detail.

In step S304, the morphological constituted data acquired by the processing is stored, and the data (the morphological constituted data) acquired by the cutting is stored in the specified area of the temporary storage part 4. In the embodiment, the morphological constituted data acquired by the processing may also be stored in the storage card 6 or the flash memory 7, or the setting mode in the fourth embodiment may be entered.

In step S305, the morphological constituted data acquired by the processing is determined as the constituted data related to the reference image.

The control part 10 as the reference image determining part determines the morphological constituted data acquired by the processing and stored in the storage part (such as the temporary storage part 4) as the constituted data related to the reference image.

In step S306, the specified position and the specified dimension of the reference image located in the infrared thermal image are determined. In the embodiment, the position and the dimension of the reference image generated by the morphological constituted data acquired by the processing located in the infrared thermal image may be determined according to the setting parameters (a self-adaptive area Z1, the reference image centering, the display area Z1 is not shown in FIG. 23) of the display area.

In step S307, the thermal imaging data acquired by photographing is transmitted to the temporary storage part 4.

In step S308, the reference image is synthesized with the infrared thermal image. The control part 10 controls the image processing part 2 to perform corresponding processing for the morphological constituted data acquired by the cutting and acquire the image data of the reference image TU23 after the pseudo-color transformation according to the determined specified dimension, and to synthesize the image data of the reference image TU23 and the infrared thermal image generated by the thermal imaging data acquired by the photographing part 1 according to the specified position and the default transparency ratio (such as 50%) to which the cutting corresponds.

In step S309, the synthesized image is displayed, as shown in the display interface G2303 in FIG. 23. Thus, the lower-level user can fully understand the purpose of the photographing assignment and requirements of quality, and the user can photograph the thermal image H23 of the photographed object according to the reference of the semi-transparent image TU23. For example, as one reference photographing effect as shown in the display interface G2304, the part of the thermal image of the photographed object in the semitransparent image TU23 matches the thermal image H23 of the photographed object, at that moment, the thermal image H23 of the photographed object conforms to the expected photographing quality requirements, which is convenient for the subsequent operation such as state assessment, analysis, or record. Further, the users can switch to only display the infrared thermal image for the state assessment.

In step S310, the control part 10 performs the control and monitors if the user withdraws from the reference mode. If yes, the reference mode is end, and if no, the steps S307 to S309 are repeated.

Then, the upper-level user can set the morphological constituted data of the acquired reference image TU23 and store it to the storage card 6, send it to the thermal imaging device of other lower-level users, or use the thermal imaging device of other lower-level users to repeat the above steps.

According to the above, in the embodiment, the reference image can be acquired conveniently and quickly by assigning the processing object and then the photographed object of the same kind can be photographed on account of the same distance, the same part, and the similar angle according to the acquired reference image, thereby making sure of the effectiveness of the detection. Further, by selecting the specified position and the specified dimension of the reference image in the infrared thermal image according to the self-adaptive area, the position and the dimension of the reference image can be quickly specified with simple operation. In the embodiment, the advantages are performed as a representative embodiment of one system. However, the user may perform certain condition, such as directly responding to the operation to determine the acquired thermal imaging data as the morphological constituted data without cutting and being synthesized semi-transparently with the subsequent infrared thermal image. Any one product of the embodiment in the invention may not need to achieve all of the advantages at the same time.

In the fourth embodiment, in the thermal imaging device 12 with the same structure of the first embodiment, the flash memory 7 stores control programs for performing related information set and record of the morphological constituted data. The control part 10, the operation part 9, and the display part 3 as an example of a related information setting part, are used for setting auxiliary constituted data (for acquiring the analyzed area, instruction mark information, or a combination thereof) corresponding to the morphological constituted data or setting information of the information of the photographed object. The control part 10 as an example of the setting record part is used for building related record between the morphological constituted data and the setting information.

For example, in step S303 in the third embodiment, the morphological constituted data acquired by the processing is acquired. At that moment, the subsequent reference mode may not be performed temporarily, and setting of the related information such as the auxiliary constituted data (such as the analyzed area or the instruction mark) or the information of the photographed object, to which the morphological constituted data corresponds, may be first performed. In addition, the morphological constituted data may be the reference image displayed in the synthesized image or the morphological constituted data read from the storage card 6.

In detail, for responding the setting instruction, the control part 10 controls the display part 3 to display the setting interface as shown in FIG. 25. The users can set different information corresponding to the reference image TU23 generated by the morphological constituted data acquired by the processing. The setting interface includes an adjusting bar SZ0 displaying the reference image and adjusting the analyzed area, an analyzed area setting bar SZ1, a prompting mark setting bar SZ3, and an information inputting bar SZ2 of the photographed object.

The adjusting bar SZ0 is used for displaying the reference image TU23, the analyzed area F23 (including the analyzed area units S01, S02, S03), and a mark position. The users can amend the area units S01, S02, S03 in the analyzed area F23, such as decreasing, changing positions, adjusting, changing (point, line, plane) types, such as changing S01, S02, S03 from rectangles to be circles, can set new area units, or adjust the mark position.

The analyzed area setting bar SZ1 is used for selecting a generating type of the analyzed area (including the analyzed area units) to which the reference image corresponds. "Point, line, plane" represents that the point, line, plane are set in the reference image as the analyzed areas. The prompting mark setting bar SZ3 is used for setting prompting mark information, such as words, arrows, to instruct the part which needs attention. The words may be diagnostic criteria of the photographed object. In addition, according to the method in the fifth embodiment, the constituted data of the analyzed area may be set by processing or computing.

The information inputting bar SZ2 of the photographed object is used for inputting the information of the photographed object to which the reference image corresponds.

When the user finishes the setting determination, the control part 10 as the setting record part builds related record for the setting information of the reference image TU23.

That is, the related information of the morphological constituted data of the reference image TU23, the constituted data of the analyzed area F23, the constituted data of the prompting mark B23, the position and dimension information of the analyzed area F23 in reference image TU23, the position information of prompting mark B23 in reference image TU23, and the information of the photographed object h23 is built and stored in the flash memory 7.

According to the above, in the embodiment, the auxiliary constituted data (for acquiring the analyzed area, the instruction mark information, or a combination thereof) corresponding to the morphological constituted data and the setting information of the information of the photographed object is set, and the related record of the morphological constituted data and the setting information is built, which is convenient for calling related data of the morphological constituted data later. Then, the reference mode can be entered, or the operation of setting and related recording may also be repeated.

In the above embodiments, the working modes such as the reference mode, the processing mode, the related information setting mode are described singly or in a certain combination. However, the invention is not limited thereto. More embodiments can be acquired by differently combining the working modes.

In the fifth embodiment, in the thermal imaging device 12 with the same structure of the first embodiment, the flash memory 7 further stores control programs for processing and/or computing the assigned object to acquire the constituted data. Further, when a main object is assigned in a plurality of objects with specified relative position relation, the position determining part first set the position parameter of the main object located in the infrared thermal image, and then set the position parameter of objects acquired by other constituted data located in the infrared thermal image. In the embodiment, regarding the reference image reflecting the specified morphological characters of the photographed object, the position parameter includes positions, dimensions, or rotating angles, and regarding to the objects acquired by the auxiliary constituted data, the position parameter includes positions, dimensions, or rotating angles, such as the positions when the analyzed area is a single point.

The photographing range area in the second embodiment may be considered as one condition of the main object. The reference range area to which the reference image corresponds represents the display reference range specified by the reference image, and the photographing range area can be considered as the main object. The main object can be directed to all objects with the specified relative position relation. In the embodiment, the flash memory 7 storing the information of the photographed object and the related constituted data in FIG. 20 is assumed.

Referring to FIG. 26, another embodiment of the setting menu is described. When a user presses a menu key to enter a menu mode, the display part 3 displays the menu as shown in FIG. 26. When one menu item is selected, the corresponding configuration interface is displayed. The control part 10 and the operation part 9 are composed of the configuration part. The control part 10 responds the operation signal of the user, to perform corresponding display control and to record the configuration contents of the user in the storage medium. The related operation is performed by the operation part 9.

Referring to the configuration interface in FIG. 27, the menu item "object processing CD1" is described, and it is used for assigning a processing object and setting (increasing, amending, deleting) a processing rule by users, to configure the morphological constituted data acquired by the processing according to the processing rule for the processing object.

The constituted data CD11 displays the information of the constituted data to be selected. The information of the constituted data to be selected may be type information of the morphological constituted data such as "contour", "texture" acquired from the table in FIG. 20. In addition, other type information such as the type information of the constituted data, to which the assigned processing object combined with the specified processing rule corresponds, may also be displayed as the type information to be selected.

The processing object CD12 is used for selecting the constituted data of the processing object by users. One or more constituted data may be selected to be the processing object, such as, capable of acquiring one or more type of the morphological constituted data by processing.

The processing rule CD13 is used for setting the processing rule of the processing object by users. The processing rule includes algorithms and related parameters of the processing. When the enter key is pressed at length as the processing algorithm is selected, the parameter bar is displayed for inputting the parameter (not shown). The processing includes cutting, threshold range extracting, edge extracting, enhancement, filtering, pseudo-color, gray scale (multicolor to be gray scale, white and black), brightness adjusting, color adjusting, or a combination thereof. In addition, other different processing known well in the field may also be configured.

Figures 28, 29:
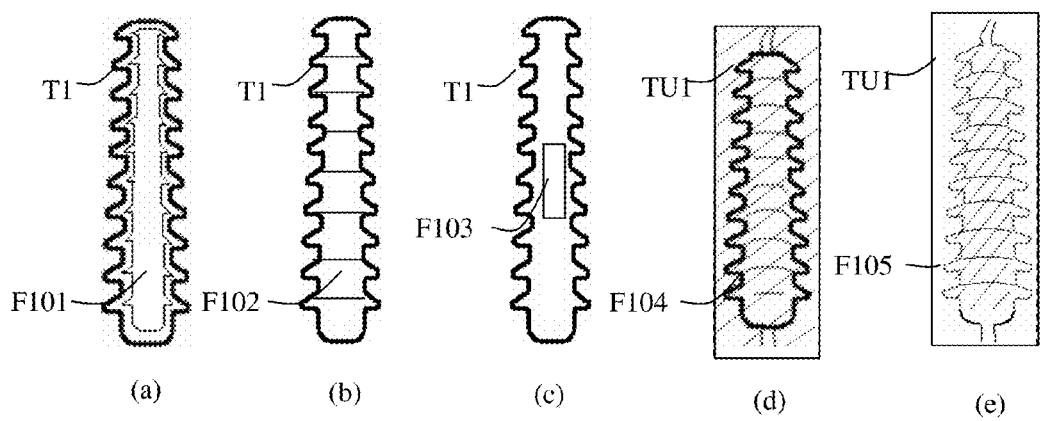
FIG. 28 is a schematic diagram showing a menu setting interface of object computing in the fifth embodiment.
FIG. 29 includes five schematic diagrams showing reference images acquired by computing or processing.

Referring to the configuration interface in FIG. 28, the menu item "object computing CD2" is described, and it is used for selecting a computing object and setting (increasing, amending, deleting) a computing rule by users, to configure the auxiliary constituted data acquired by the computing object according to the computing rule. The configured auxiliary constituted data can be as part of the reference image with the morphological constituted data, thereby enhancing the reference effect of the reference image.

The constituted data CD21 displays the information of the constituted data to be selected. The information of the constituted data to be selected may be type information such as "contour", "texture", or "analyzed area" acquired from FIG. 20. In addition, other type information such as the type information of the constituted data, to which the assigned computing object combined with the specified computing rule corresponds, or the type information of the constituted data, to which the assigned processing object combined with the specified processing rule corresponds, may also be displayed as the type information to be selected.

The computing object CD22 is used for selecting a computing object by users. One or more type of the constituted data may be selected as the computing object, such as capable of acquiring one or more type of the constituted data by computing.

The computing rule CD23 is used for selecting and setting the computing rule of the computing object by users. The computing rule includes algorithms and related parameters. The algorithm may be scaling, warping, computing a feature point, computing a feature area, halving, computing a bounding rectangle, computing an inscribed rectangle, or computing a center line. The parameter may be a scaled base point and a scaling rate, a warped base point and a warping rate (such as an aspect ratio), a computing parameter of the feature point, a feature area type (such as point, line, plane) and dimension based on the feature point, a halving number, or related parameters of the algorithms. When the enter key is pressed at length as the algorithm is selected, the parameter bar is displayed for inputting the parameter (not shown). One or more computing rule may be selected for the selected computing object. The computing of the feature point may be computing a center point of the contour or computing a feature point (such as a highest temperature point) of the thermal imaging data.

In addition, the processing and/or computing object to be selected can be assigned from the displayed reference image, thermal image documents in the storage medium such as the storage card 6, the photographed thermal imaging data, or the infrared thermal image.

The configuration menus of "object processing CD1" and "object computing CD2" may also be combined to one configuration interface. One or more processing rule and/or one or more computing rule can be selected for the assigned object (such as the prestored constituted data in FIG. 20, the thermal image documents in the storage card 6, or the photographed thermal imaging data), and the processing and/or computing may be called handling for the assigned object. In addition, the related processing rule or computing rule may be configured, and the specified constituted data may not be assigned, such as default configuration suitable for subsequent selected constituted data.

Referring to FIG. 29, the function and effect of the reference image acquired by computing or processing are described.

Referring to the reference image in FIG. 29 (a), the constituted data of the contour image T1 is used as a computing object, and after scaling and warping is performed by using a center point of the contour image T1 as a base point, the image F101 is acquired. The reference image can be used for prompting the users to observe temperature distribution of a specified area on the main body of the photographed object, thereby reducing influence of surrounding environment to assessment.

Referring to the reference image in FIG. 29 (b), the constituted data of the contour image T1 is used as the computing object, the algorithm parameter is eight-equal part, and the eight-equal area F102 is acquired. The reference image can be used for prompting the users to observe temperature distribution of different parts of the main body of the photographed object.

Referring to the reference image in FIG. 29 (c), the constituted data of the contour image T1 is used as the computing object, the algorithm parameter is to compute based on a feature point (such as a center point), and the area F103 with a specified dimension based on the center point is set. The reference image can be used for prompting the users to observe the area.

Referring to the reference image in FIG. 29(d), the constituted data of the local infrared thermal image TU1 is used as the processing object, the processing rule may be edge contour extracting, and the edge contour image F104 is acquired, thereby improving the reference effect of the local infrared thermal image TU1.

Referring to the reference image in FIG. 29 (e), the constituted data of the local infrared thermal image TU1 is used as the processing object, the processing rule may be to extract pixel points (range extracting) above a specified temperature threshold, and the image F105 is acquired. In some condition, the reference effect of the image F105 for the main body of the photographed object is better than the effect of the local infrared thermal image TU1 as the reference image.

Referring to the configuration interface in FIG. 30, the configuration of "reference image CD3" is described.

The "reference image CD3" is used for setting the constituted data, position rules, and synthesized parameters related to the reference image in a non-switch state in the reference mode by the users.

The constituted data CD31 displays the information of the constituted data to be selected, such as the type information "contour", "texture", or "analyzed area" acquired from FIG. 20. In addition, other type information such as the type information "contour (processing)" of the constituted data to which the assigned processing object combined with the specified processing rule corresponds and set in "object processing CD1", or the type information "contour (computing)" of the constituted data to which the assigned computing object combined with the specified computing rule corresponds and set in "object computing CD2", may also be displayed for selection.

The reference image CD32 is used for selecting the constituted data acquiring the reference image by the users. One or more constituted data can be selected to acquire the reference image. In the embodiment, the object acquired by each constituted data is used as a synthesized object. That is, when more constituted data is selected, the reference image includes a plurality of synthesized objects (also meaning that more constituted data acquires the reference image). The reference image CD32 may also be selected, and the enter key is pressed at length, thereby capable of determining part or all of the selected constituted data as one synthesized object (not shown).

Referring to FIG. 30, the determined constituted data is described. At least one constituted data or more constituted data may be selected from "contour", "texture", "analyzed area" stored in the flash memory 7, the morphological constituted data such as "contour (processing)" to which the specified processing object combined with the specified processing rule corresponds, and the auxiliary constituted data such as "contour (computing)" to which the constituted data of the specified computing object combined with the specified computing rule corresponds. The constituted data may be more morphological constituted data or may include the morphological constituted data and the auxiliary constituted data.

In addition, the thermal imaging data acquired by photographing may be selected as the constituted data, or the thermal imaging documents acquired from the storage card 6 may also be selected as the constituted data. Then, the constituted data stored in the storage medium (such as the flash memory 7, the storage card 6, or the temporary storage part 4) and the selected configuration may be used to determine the constituted data related with the reference image.

The position rule CD33 is used for configuring the position rule related with the position parameter of the reference image located in the infrared thermal image by users.

When the main object is assigned, the position determining part is used for setting the position parameter of the main object located in the infrared thermal image, and then the position parameter of other objects located in the infrared thermal image is automatically set through the specified relative position relation between the main object and other objects combined with the position parameter of the main object located in the infrared thermal image. For example, the main object with the specified relative position relation of the reference image may be first determined, and the position parameter of the main object located in the infrared thermal image may be set. Then, the position parameter of the reference image located in the infrared thermal image can be set according to the specified relative position relation between the reference image and the main object and the position parameter of the main object located in the infrared thermal image.

When the constituted data for acquiring the main object is not selected, the objects acquired by the constituted data selected in "reference image CD32" set the position parameters according to the respective position rule.

According to FIG. 30, the main object can be selected from the constituted data CD31, such as the reference image, one part of the reference image, or the main object acquired by other constituted data except the constituted data of the reference image. That is, the constituted data for acquiring the main object may be one or more of the constituted data of the object with the specified relative position relation, such as the morphological constituted data (such as "contour"), the constituted data related with the morphological constituted data (such as "analyzed area"), the constituted data to which the assigned computing object combined with the specified computing rule corresponds (such as "contour (computing)"), or the constituted data to which the assigned processing object combined with the specified processing rule corresponds (such as "contour (processing)"). When more of the constituted data is assigned to acquire the main object, the combined object acquired by the more of the constituted data may be used as the main object.

Usually, the set main object represents the area which needs key observation. By exchanging the main object, the exchange of the reference image in different display positions can be realized, thereby realizing different photographing aims. In addition, the users can further select the reference image (one or more of the synthesized objects) displayed on the display part 3 as the main object.

Self-adaption is used for selecting a position setting mode of the self-adaption and assigning a self-adaptive object (such as the main object when the main object is selected). The self-adaptive area is a specified area in the infrared thermal image. By selecting the self-adaptive area and pressing the enter key at length, the position, dimension, and rotating angle of the self-adaptive area located in the infrared thermal image can be set, and the position (capable of being used as a scaling base point of the self-adaption) and rotating angle of the self-adaptive object located in the self-adaptive area can be set. In the embodiment, 90% of a centering window area of the infrared thermal image can be used as the self-adaptive area, which is called Z1 for short, and the self-adaptive object is centered and self-adaptive in Z1.

The assigned position is used for assigning the position parameter of the reference image (such as the main object, when the main object is selected) acquired by the selected constituted data and located in the infrared thermal image. When the user selects the "assigned position" bar, an input bar (not shown) is displayed, and the user can input the position, dimension, and rotating angle of the object acquired by the selected constituted data and located in the infrared thermal image. When the above is not input, the position origin may be defaulted as a top-left corner of the infrared thermal image, the dimension is an original dimension, and the rotating angle is zero.

When the related position is selected, the position parameter of the object acquired by the constituted data and located in the infrared thermal image is acquired, according to the position information in advance related to the selected constituted data (such as the main object when the main object is selected).

The synthesized parameter CD34 is used for setting the synthesized parameter of the reference image acquired by the selected constituted data and the infrared thermal image. The synthesized parameter may be a transparency ratio, a color or a line-type (not shown) according to different types of the constituted data, a synthesized order when the reference image includes a plurality of synthesized objects, or the synthesized parameter related to the constituted data.

When more types of the constituted data are determined, more types of the constituted data may be used to acquire a synthesized object (as the reference image), and the position determining part can set the position and dimension of more types of the constituted data in the background during synthesis and the position and dimension of the finally acquired reference image located in the infrared thermal image. A plurality of the synthesized objects (as the reference image) capable of acquiring by more of the constituted data may be synthesized with the infrared thermal image in turn according to the specified synthesized order and transparency ration, to acquire the synthesized image of the reference image and the infrared thermal image, thereby realizing the collective display. At that moment, the position determining part sets the positions and dimensions of the synthesized objects, respectively, located in the infrared thermal image.

The switch CD4 is used for setting configuration information related to the switch object when the switch key of the operation part is pressed in the reference mode such as the collective display state of the reference image and the infrared thermal image configured in "reference image CD3". Referring to the configuration interface in FIG. 31, the configuration of "switch CD4" is described. The configuration information of switch may be the type of the switched constituted data, the position rule of the object acquired by the switched constituted data, the synthesized parameter (such as an overlapping order, a transparency ratio, or a color), or an exchange thereof, to acquire the configuration with different using effects of the reference image in FIG. 30. In addition, the infrared thermal image can be used as the switch object, and others are similar to "reference image CD3", without detailed description. The arrow CD40 of the switch CD4 is used for setting (increasing, amending, deleting) the switch rule. For example, the next switch interface may be entered via the arrow CD40, to configure more configuration information of the switch object.

In the fifth embodiment, the photographing aim of the users is to detect the whole thermal field distribution (the whole part represented by the contour image T6) of the photographed object h6. If there is a questionable part, a key analyzed part (the area represented by the analyzed area F6) of the photographed object may be approached. To realize the detecting aim conveniently, the users perform configuration before and after switch of the reference image.

By "reference image CD3", the user set the configuration as shown in FIG. 30, the reference image includes "contour" and "analyzed area", the position rule is that the contour (main object) and the self-adaptive area Z1 are centered and self-adaptive, and the synthesized parameter is that the transparency ratio is one. The synthesized order of "contour" is one, the synthesized order of "analyzed area" is two, and the color may default to the personal attributive color.

By "switch CD4", the user set "switch one" as shown in FIG. 31, the reference image includes "contour", "analyzed area", the position rule is that the analyzed area (main object) and the self-adaptive area Z1 are centered and self-adaptive, and the synthesized parameter is that the transparency ratio is one. The synthesized order of "contour" is one, the synthesized order of "analyzed area" is two, and the color may default to the personal attributive color.

When the switch key is pressed, the collective display of "contour (main object), analyzed area" and the infrared thermal image is switched to the collective display of "contour, analyzed area (main object)" and the infrared thermal image. When the switch key is pressed again, the display state is returned to the collective display of "contour (main object), analyzed area" and the infrared thermal image. Different main objects are used, representing control modes with different concerned focuses.

In the embodiment, the constituted data stored in the flash memory 7 (as shown in FIG. 20) is used as an example of the reference image. According to the description of the menus in FIG. 26 to FIG. 31, the user can configure the reference image with different effects based on the constituted data stored in the flash memory 7 such as the assigned computing object combined with the computing rule or the assigned processing object combined with the processing rule. The reference image may also be configured based on the thermal imaging documents stored in the storage card 6, or based on the photographed thermal imaging data. As the difference of the constituted data of the reference image, the position rule, or the synthesized parameter, the reference image with different reference effects and applications may be acquired. The switch image with different applications and effects can be acquired by configuration of switch.

In addition, even when the information of the photographed object in FIG. 4 or FIG. 19 is only related to one of the morphological constituted data, the user can configure the related constituted data by "reference image CD3" or "switch CD4" (for example, the user may set the constituted data, to which the related morphological constituted data combined with the specified processing rule or computing rule corresponds, by "object processing CD1" and "object computing CD2") and configure the reference image with different effects. The related morphological constituted data and the specified determined type of the processed and/or computed constituted data can be configured, thereby for flexible use.

When the setting operation is finished, the enter key is pressed. The control part 10 allows the set configuration to be stored in the flash memory 7 (such as a configuration file), using as default configuration of the thermal imaging device 12 without setting every time when using, and then returns to the standby photographing state. Although the embodiment of the related configuration performed by the user is described, the invention is not limited thereto, and the following embodiments can be performed. That is, when the thermal imaging device 12 leaves the factory, the related configuration of the processing is configured, without any manual setting. Otherwise, the configuration is finished in an external computer, and the configuration document is loaded to the thermal imaging device 12 before photographing. Otherwise, the user performs configuration for part of the above described content. Thereby, the constituted data can be automatically determined according to the specified determined type (such as the stored type, the type to which the processing object combined with the processing rule corresponds, or the type to which the computing object combined with the computing rule corresponds) of the constituted data, and the specified position, specified dimension, or rotating angle of the reference image located in the infrared thermal image are automatically determined according to the position rule of the reference image.

Figure 34:
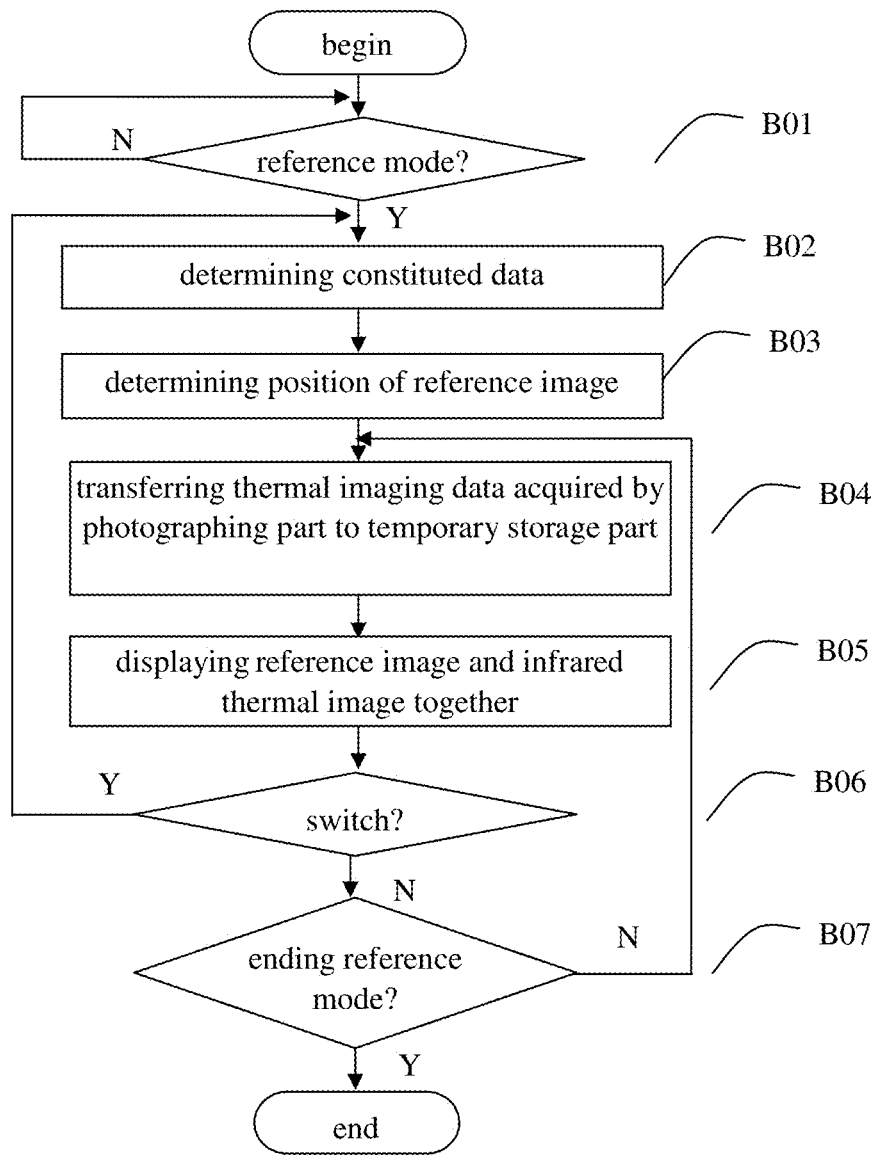
FIG. 34 is a control flow chart showing a reference mode in the fifth embodiment.

Referring to FIG. 34, the flowchart in the fifth embodiment is described.

In step B01, the control part 10 continuously monitors if the user selects the reference mode. When the user selects the reference mode by the operation part, the step B02 is entered.

In step B02, the control part 10 determines the constituted data. According to the configuration in FIG. 30, when the photographed object h6 is selected, the constituted data of the contour image T6 and the analyzed area F6 is used as the constituted data for acquiring the reference image.

In step B03, the position determining part determines the specified position and specified dimension of the reference image located in the infrared thermal image. According to the configuration in FIG. 30, the position parameters of the contour image T6 and analyzed area F6 located in the infrared thermal image and acquired by the constituted data of the contour image T6 and the constituted data of the analyzed area F6 may be computed, respectively. First, according to the "contour" type of the main object, the specified position and the specified dimension of the main object T6 in the infrared thermal image are computed. Then, according to the specified relative position relation of the analyzed area F6 and the contour image T6 and the position parameter of the contour image T6 in the infrared thermal image, the position and dimension of the analyzed area F6 in the infrared thermal image is determined, and the specified relative position relation remains the same.

However, there is the following application. According to the position parameter of the contour image T6 in the infrared thermal image, the position of the analyzed area F6 (auxiliary image) in the infrared thermal image is determined. The relative position of the analyzed area F6 and the contour image T6 remains the same, and the dimension of the analyzed area F6 can be the original dimension.

In step B04, the photographed thermal imaging data is transmitted to the temporary storage part 4.

In step B05, the reference image with the specified dimension acquired by the determined constituted data is displayed together with the continuous infrared thermal image generated by the thermal imaging data acquired by the photographing part according to the specified position. In one embodiment, the image processing part 2 synthesizes the image acquired by the constituted data of the selected T6 according to the specified dimension and the image acquired by the constituted data of the determined F6 according to the position parameter set by the position determining part with the infrared thermal image, respectively, in turn, according to the respective specified position. The synthesized image data is stored in the temporary storage part 4, and then the synthesized image is displayed at the display part 3.

In the embodiment, since the reference image includes the contour image T6 and the analyzed area F6, and the synthesized order is different, according to the synthesized order and transparency ratio of the respective object, the contour image T6 is first synthesized with the infrared thermal image according to the specified transparency ratio to acquire the medium data, and then the analyzed area F6 is synthesized with the medium data according to the specified transparency ratio to acquire the final synthesized image data.

Figure 32:
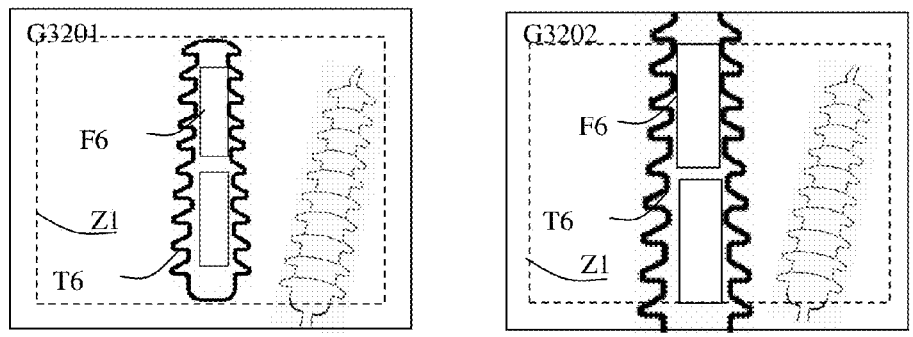
FIG. 32 is a schematic diagram showing a display interface of photographing the photographed object by the reference image composed of a contour and analyzed areas and switching the reference image.

Referring to the display interface G3201 in FIG. 32, the display of the contour image T6 is with that of the analyzed area F6. According to the reference of the contour image T6, the specified morphological characters of the thermal image of the photographed object are easy for understanding. According to the reference of the analyzed area F6, the prompting of the key observation part is easy to be obtained, thereby easily understanding the photographing aim.

In step B06, the control part 10 determines if the user performs switch operation. If the switch operation is performed, the switch processing is performed, that is, returning to the step B02. At that moment, according to the set switch configuration, the switched reference image or the infrared thermal image is determined.

When the user presses the switch key in the display state G3201, according to the configuration in FIG. 31, the type of the main object is "analyzed area", and the specified position and the specified dimension of the main object (the analyzed area F6) in the infrared thermal image are computed. Then, according to the specified relative position relation of the analyzed area F6 and the contour image T6 and the position parameter of the analyzed area F6 in the infrared thermal image, the position parameter of the contour image T6 in the infrared thermal image is determined. The display interface G3202 in FIG. 32 shows a display effect of setting the analyzed area F6 as the main object (self-adaption, self-adaptive area Z1, centering), reflecting the photographing aim that the area represented by the analyzed area F6 is main. Although part of the contour image T6 may overflow, the overflow is acceptable with suitable application need. Thus, the user approaches the photographed object for photographing with the reference of the reference image with the specified morphological characters, thereby assuring the photographing quality. If the user presses the switch key again, the display state G3201 is switched back.

In step B07, the control part 10 determines if the user withdraws from the reference mode.

If no, return to the step B04, reflecting the continuous synthesis and collective display of the contour image T6 and the analyzed area F6 and the continuous dynamic infrared thermal image. If there is an exit instruction, the reference mode is end.

In addition, in another embodiment, according to the specified relative position relation between the objects acquired by the constituted data (the morphological constituted data) of the contour image T6 and the constituted data (the auxiliary constituted data) of the analyzed area F6, one synthesized object is first synthesized, and then the specified position and the specified dimension of the synthesized object located in the infrared thermal image are set, without computing the specified position and the specified dimension of the respective acquired synthesized object in the infrared thermal image. Then, the synthesized object with the specified dimension is continuously synthesized with the infrared thermal image generated by the thermal imaging data acquired by the photographing part according to the specified position, to realize the collective display of the reference image and the infrared thermal image.

Further, to reflect effects of different main objects, in the embodiment, the reference images before and after switch are taken for example. The switch may not be performed. Further, in FIG. 32, the contour image T6 and the analyzed area F6 as the main objects, respectively, for switching are taken for example. Other objects having the specified relative position relation with the reference image may also be used as the main object.

Figure 33:
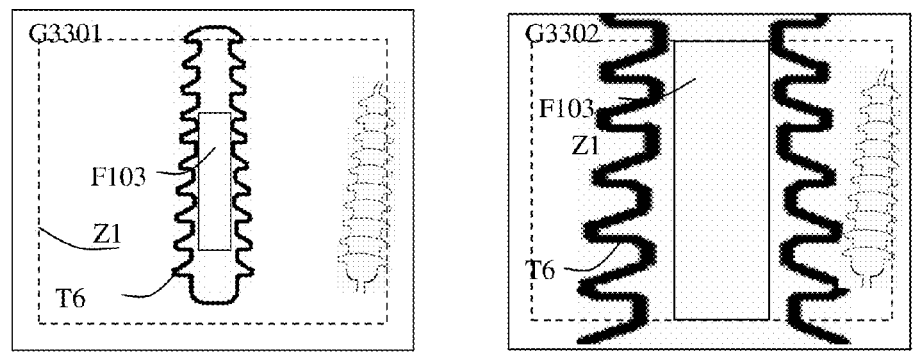
FIG. 33 is a schematic diagram showing a display interface of photographing the photographed object by the reference image composed of the contour and computed areas and switching the reference image.

In FIG. 33, assuming that the key observation part of the user is a middle part of the photographed object, the following configuration may be performed for the contour. That is, in FIG. 28 (the object computing CD2), the center point and the dimension of an expected key observation part are configured by using the contour image T6 as the computing object, to acquire the area F103. When the determined constituted data (more) includes the computing object combined with the computing algorithm, in one embodiment, the control part 10 controls the image processing part 2 to compute the computing object (the contour image T6) to acquire the area F103. The position determining part sets the position information of the reference image located in the infrared thermal image, based on the reference image acquired by the data acquired after the constituted data of the non-computing object in the determined constituted data and the computing object is computed. When the contour image T6 is used as the main object, such as the position parameter of the area F103 is determined according to the position parameter after the self-adaption of the contour image T6, G3301 in FIG. 33 is displayed. When the area F103 is used as the main object, according to the position parameter of the area F103 after self-adaption, the position parameter of the contour image T6 is determined, as shown in G3302 in FIG. 33 (the contour image T6 is shown in bold, or not). Thus, the user can configure the reference image flexibly according to the photographing aim.

Further, the area F103 is not limited to be displayed as part of the reference image, and it may also be used for recording. When the area is used as the analyzed area, the record is convenient for the subsequent batch processing.

The same is to the processing object combined with the processing rule. For example, the reference image is acquired by determining the constituted data (as the main object) to which the processing object and the processing rule corresponds. In one embodiment, the image processing part 2 processes the processing object, and then the position determining part determines the position information of the acquired reference image located in the infrared thermal image, thereby acquiring the reference image. When there is the constituted data (not main object) to which the processing object and the processing rule correspond in the determined (more) constituted data, in one embodiment, the position determining part determines the position parameter of the reference image located in the infrared thermal image, based on the reference image acquired by the determined constituted data including the constituted data of non-processing object and the constituted data corresponding to the processing object. The position parameter of the main object is first determined, and then according to the position parameter of the main object, the position parameter of the image generated by the acquired constituted data, thereby acquiring the reference image.

According to the above, in the fifth embodiment, according to the reference of the reference image acquired by a plurality types of the constituted data, the key photographing part can be determined according to the photographing aim, further to improve the reference effect. To acquire the constituted data by processing and/or computing, the work load of preparing the constituted data such as the analyzed area in advance can be reduced, and the reference image conforming to the photographing aim or the analyzed area for subsequent batch processing is convenient to be configured. By exchanging the main object, the exchange in different display positions can be realized, thereby satisfying different photographing aims. In the embodiment, convenient and flexible application modes are provided for improving the whole quality of photographing and recording. Although in the fifth embodiment the configuration (including processing and/or computing) of the constituted data related to the reference image, the determination of the constituted data, the setting of the position of the reference image, the display parameter of the reference image, and the configuration mode of the switch of the reference image are described, the thermal imaging device 12 may not be set by users. The elements can be configured when the thermal imaging device 12 leaves the factory. In use, according to the morphological constituted data in the storage medium, the configuration, determination, position setting, parameter displaying, and switching of the constituted data of the reference image can be automatically performed. Any product in the embodiment of the invention may not need to achieve all of the advantages at the same time.

Although in the first embodiment to the fifth embodiment, the thermal imaging device includes the photographing part, the thermal imaging data acquired by photographing is not necessary in the invention, and the thermal imaging device may receive and process the thermal imaging data (thermal image transmitting data) from external part. The thermal image transmitting data may be the thermal imaging data photographed by the thermal image photographing device connected with the thermal image processing device, the data such as the infrared thermal image acquired after the specified processing of the thermal imaging data, the compressed thermal imaging data, or the image data of the compressed infrared thermal image. In the sixth embodiment, the thermal image processing device 100 is taken as an example of the thermal imaging device.

Figure 35:
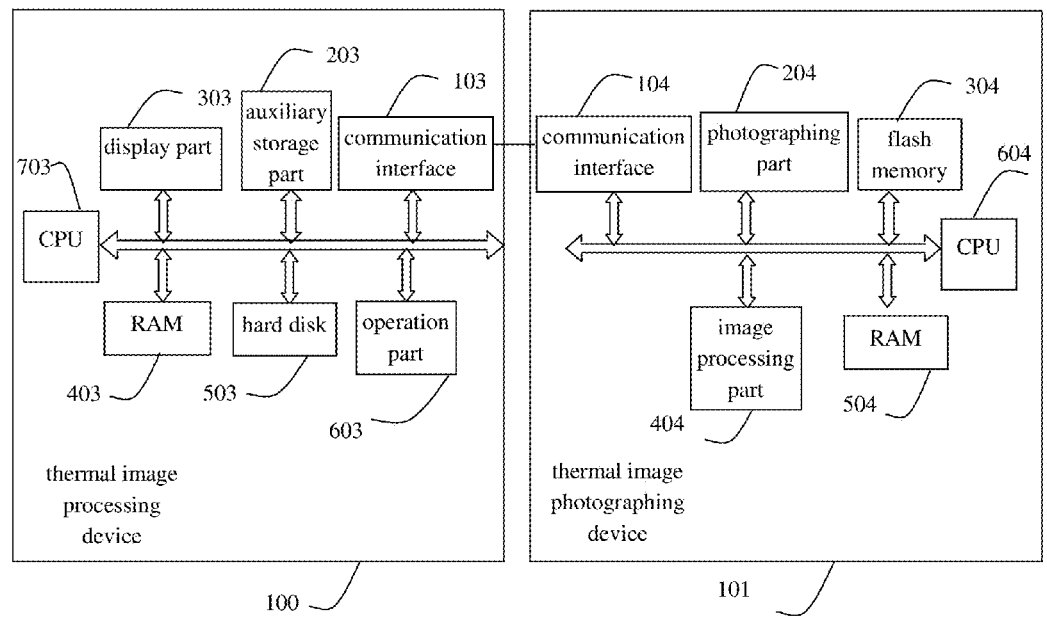
FIG. 35 is a block diagram showing a thermal image processing system including a thermal image processing device and a thermal image photographing device in a sixth embodiment.

FIG. 35 is a frame diagram showing a thermal imaging system including a thermal image processing device 100 and a thermal image photographing device 101 connected with each other.

The thermal image processing device 100 includes a communication interface 103, an auxiliary storage part 203, a display part 303, a RAM 403, a hard disk 503, an operation part 603, and a CPU 703 connected with the above parts and for controlling the whole. The thermal image processing device 100 may be a personal computer, a personal digital assistant, or a display device cooperated with the thermal imaging device. The thermal image processing device 100 receives the thermal image transmitting data output from the thermal image photographing device 101 connected with the thermal image processing device 100 through the communication interface 103 based on the control of the CPU 703.

The communication interface 103 (an example of the acquiring part) is used for continuously receiving the thermal imaging data outputted from the thermal image photographing device 101, such as the thermal image transmitting data transmitted via a relay (the thermal imaging data outputted by the thermal image photographing device 101 is transmitted via the relay), and it may also be used as a communication interface for controlling the thermal image photographing device 101. In the embodiment, the communication interface 103 includes different kinds of wired or wireless communication interfaces of the thermal image processing device 100, such as a network interface, a USB interface, a 1394 interface, or a video interface.

The auxiliary storage part 203 may be a storage medium such as CD-ROM or storage card and a related interface.

The display part 303 may be a liquid display, the display part 303 may also be other displays connected with the thermal image processing device 100, and the thermal image processing device 100 may not include the display in its structure.

The RAM 403 is used as buffer storage for temporarily storing the thermal image transmitting data received by the communication interface 103, and is used as work storage of the CPU 703 for temporarily storing the data processed by the CPU 703.

The hard disk 503 stores control programs and different data used in control.

The operation part 603 is used for performing different operation such as instruction operation or setting information input by users. The CPU 703 executes related programs according to operation signals of the operation part 603.

The CPU 703 further performs functions of the image processing part, and is used for performing specified processing for the received thermal image transmitting data to acquire the image data of the infrared thermal image. The specified processing may be the processing for exchanging to be suitable for displaying or recording, such as amending, interpolation, pseudo-color, synthesis, compression, or decompression. According to the different forms of the thermal image transmitting data, when the thermal image transmitting data received by the CPU 703 is the compressed thermal imaging data, the specified processing may be compression and specified processing of the thermal image transmitting data received by the acquiring part performed by the CPU 703. In one embodiment, the corresponding specified processing may be pseudo-color processing after the thermal imaging data (thermal image transmitting data) is compressed, to acquire the image data of the infrared thermal image. In addition, the specified processing may be specified different processing such as correction or interpolation for the thermal image transmitting data after compression. In another embodiment, for example, when the received thermal image transmitting data is the image data of the compressed infrared thermal image, the image data of the infrared thermal image is acquired by compression. In another embodiment, for example, when the communication interface 1 receives the analog infrared thermal image, the image data of the digital infrared thermal image is acquired after AD conversion via related AD conversion circuits and is transmitted to the temporary storage part 403.

The structure of the thermal imaging device 12 except the photographing part 1 is similar with that of the thermal image processing device 100. The thermal image processing device 100 acquiring the thermal image transmitting data is also applied to the above embodiment. Therefore, the description of the embodiment is omitted.

The thermal image photographing device 101 may be different types of the thermal image photographing device and may be used for photographing the photographed object and outputting the thermal image transmitting data. In FIG. 35, the thermal image photographing device 101 includes a communication interface 104, a photographing part 204, a flash memory 304, an image processing part 404, a RAM 504, and a CPU 604. The CPU 604 controls the whole action of the thermal image photographing device 101, and the flash memory 304 stores control programs and data using in control of different parts. The photographing part 204 includes an optical part, a driving part, a thermal image sensor, and a signal preprocessing circuit, and is used for photographing to acquire the thermal imaging data. The thermal imaging data is temporarily stored in the RAM 50, and then is performed specified processing (such as compression) via the image processing part 404 (such as a DSP) to acquire the thermal image transmitting data output via the communication interface 104. According to Difference of the design and using aim, for example, the thermal image photographing part 101 may output the thermal imaging data, the image data of the infrared thermal image, data after specified format compression of the thermal imaging data or the image data of the infrared thermal image, or a combination thereof, which is all called thermal image transmitting data. In the embodiment, the thermal image photographing device 101 is used for photographing and outputting the thermal image transmitting data, which has the function similar with the photographing part 1 of the thermal imaging device 12.

Figure 36:
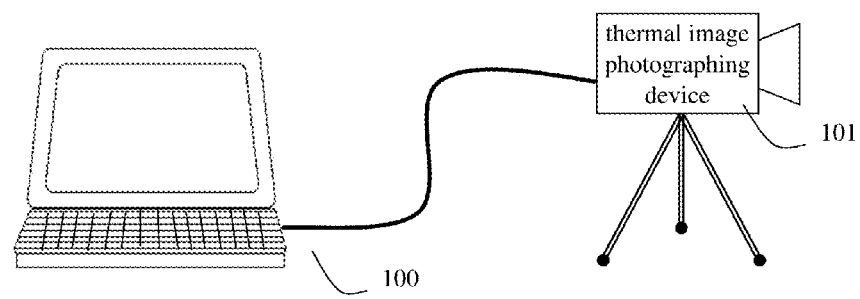
FIG. 36 is a schematic diagram showing a thermal image processing system including the thermal image processing device and the thermal image photographing device in the sixth embodiment.

FIG. 36 is a schematic diagram showing a thermal image processing system including the connected thermal image processing device 100 and the thermal image photographing device 101 in one embodiment.

The thermal image photographing device 101 is connected with the thermal image processing device 100 via a tripod (or a holder to be disposed at a detection vehicle) in a mode with communication wires such as special cables or in a wired or wireless local area network. The users watch and monitor the thermal image of the photographed object via the thermal image processing device 100. The thermal image photographing device 101 is connected with the thermal image processing device 100 to form the thermal image processing system in the embodiment, used for photographing the photographed object to acquire the thermal imaging data and to output the thermal image transmitting data.

In the seventh embodiment, in the thermal imaging device 12 with the same structure in FIG. 1, the flash memory 7 stores the infrared thermal image for performing playback in the playback mode and control programs for setting the reference image and adjusting the reference image.

In one embodiment, in the playback mode, the thermal imaging data to be processed is selected (such as selecting the thermal image documents to be processed via the storage card 6. Then, the corresponding constituted data is determined to acquire the reference image, such as, determining if the thermal imaging data (frame) includes the related information of the constituted data of the reference image, such as constituted data related to the thermal imaging data, identity information of the constituted data, or information of the photographed object. If yes, the constituted data of the reference image is determined according to the related information, and if no, the document name, number, or thumbnail related to the identification of the constituted data for selection is displayed for the users to select. Then, the reference image and the infrared thermal image acquired by the thermal imaging data to be processed are displayed together (such as in FIG. 37(a)). At that moment, the user can check up the photographing quality. If the photographing quality is not better, such as, the visual matching degree of the thermal image of the photographed object in the infrared thermal image and the reference image is not better, the photographing may be performed again, thereby avoid mistakes in subsequent batch processing. Otherwise, the user may also adjust the reference image T151, to match the thermal image IR1 of the photographed object in the infrared thermal image. That is, according to the adjustment of the user, the position determining part correspondingly determines the position, dimension, and rotating angle of the reference image T151 located in the infrared thermal image, and reflects the adjusting effect on the display part. For example, when the visual matching effect in FIG. 37 (c) is achieved via the state in FIG. 37 (b), the subsequent processing is performed. For example, the relation of the position parameter of the reference image T151 and the thermal imaging data may be record for subsequent batch processing, or the analyzed area to which the reference image T151 corresponds is called for analysis, avoiding the trouble of setting the analyzed area and assuring accuracy of analysis.

The embodiment is not limited to the thermal imaging device with the photographing function, in the embodiment, the thermal image processing device (such as a computer, a personal digital assistant, a display device cooperated with the thermal imaging device with the photographing function) may be used as an example of the thermal imaging device, and is used for examination and assessment for the infrared data (such as the thermal image documents) during arrangement. In addition, to assess and exam the infrared thermal image during playback, when the reference image includes instruction of auxiliary objects such as the analyzed area, the user is convenient to assess.

When the thermal imaging data is assessed, analyzed, and arranged, via the operation such as display or adjustment of the reference image, the trouble of setting the analyzed area by the users can be reduced, and arrangement and adjustment before document batch of the thermal imaging data can be convenient, thereby assuring availability of batch and greatly reducing workload and technical requirements of the users.

In the above embodiment, the configuration for different processing by the users is described. When the configuration is finished, the set configuration stored in the flash memory 7 (such as a configuration document) is used as the default configuration of the thermal imaging device 12 without setting every time when using. However, the invention is not limited thereto. For example, when the thermal imaging device 12 leaves the factory, one or more of the settings may be configured, such as the embodiment of the specified determined type of the constituted data, the embodiment of the processing object and the specified processing rule, the embodiment of the computing object and the specified computing rule, the embodiment of the position setting processing, and the embodiment of the synthesized parameter. In use, according to the constituted data in the storage medium, the embodiment of the processing may be performed automatically according to the factory settings. Otherwise, part items may be configured when leaving the factory, and the users can configure the other parts.

In addition, in the embodiment, the determination of the constituted data of the reference image and the determination of the position of the reference image is described according to certain processing steps. However, the processing steps are not limited to the step order in the description and may have different processing orders. More embodiments may be obtained by differently combining the above processing.

Figure 37:
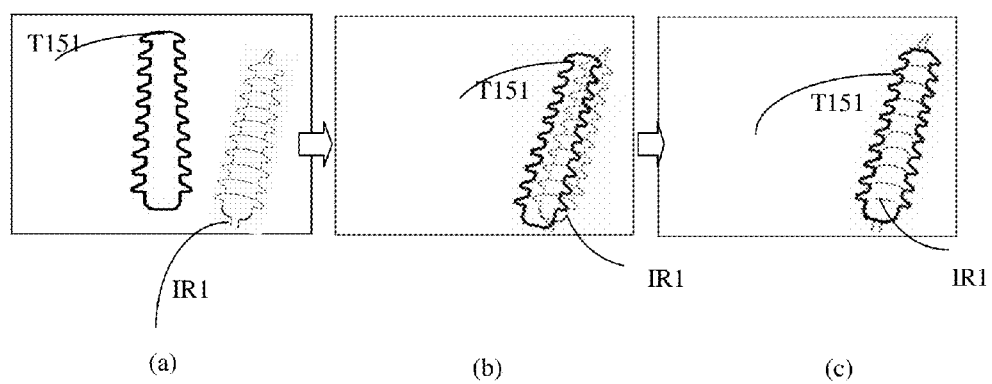
FIG. 37 is a schematic diagram of a display interface showing an adjusting process of a reference image according to a thermal image of a photographed object in a seventh embodiment.

In addition, in FIG. 15, FIG. 23 (G2304), and FIG. 37 (c), the total matching visual effect of the reference image and the thermal image of the photographed object is reflected. In actual use, a margin of error is allowable.

In addition, in the above embodiment, the analyzed area is mainly used as an example of the auxiliary object or auxiliary constituted data. However, in the infrared detection field, the auxiliary constituted data is not limited to the constituted data of the analyzed area, and may be the constituted data of different auxiliary images related to reference photographing such as the attention area or the prompting area.

In addition, in the embodiment, the electric power industry as the scene is taken for example, and different fields of the infrared detection are also applied.

In addition, private circuits, common processors, or programmable FPGA may be used to realize the processing and control functions of part or whole of the parts in the embodiment of the invention.

In addition, in the embodiment of the invention, a computer program is provided. Digital signals of the computer program are record in the readable record medium of the computer, such as a hard disk or storage. The program is executed to perform the following steps.

In an acquiring step, the thermal imaging device acquires the thermal imaging data. In a reference image determining step, the constituted data related to the reference image reflecting the morphological characters of the photographed object is determined. In a position determining step, the specified position and specified dimension of the reference image acquired by the determined constituted data located in the infrared thermal image are determined. In a synthesized step, the infrared thermal image and the reference image is synthesized to acquire a synthesized image. The infrared thermal image is generated according to the specified position and the thermal imaging data acquired by the acquiring part. The reference image is acquired according to the specified dimension and the constituted data determined by the reference image determining part.

In the embodiment of the invention, a readable storage medium is provided for storing computer programs of exchange of electronic data. The computer program allows the computer in the thermal imaging device to perform the following steps. In 311) an acquiring step, the thermal imaging device acquires the thermal imaging data. In 312) a reference image determining step, the constituted data related to the reference image reflecting the specified morphological characters of the photographed object is determined, and the determined constituted data is used for acquiring the reference image reflecting the specified morphological characters of the photographed object. In 313) a position determining step, the specified position and specified dimension of the reference image acquired by the assigned constituted data and located in the infrared thermal image are set. In 314) a display control step, the reference image with the specified dimension acquired by the assigned constituted data is displayed together with the infrared thermal image generated by the acquired thermal imaging data according to the specified position and the specified dimension. The constituted data is the data related to the reference image, and the reference image is the image reflecting the morphological characters of the photographed object.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A thermal imaging device comprising:
    an acquiring part for acquiring thermal imaging data;
    a storage part for storing information of photographed objects;
    a selecting part for selecting information of a photographed object prestored in the storage part according to a need at a photographing scene by a user;
    a reference image determining part for determining constituted data related to a reference image reflecting specified morphological characters of a photographed object, the determined constituted data being used for acquiring the reference image reflecting the specified morphological characters of the photographed object; the reference image determining part for determining the constituted data for acquiring the reference image according to the selected information of the photographed object from the stored information of photographed objects in the storage part through the selecting part and the constituted data related to the information of the photographed object; the information of the photographed object being information representing identity of the photographed object comprising a type, a name, a number, a place of the photographed object, or a combination thereof;

a position determining part for determining a specified position and a specified dimension of the reference image located in an infrared thermal image;

a synthesizing part for synthesizing the infrared thermal image and the reference image to acquire a synthesized image according to the specified position, wherein the infrared thermal image is generated according to the thermal imaging data acquired by the acquiring part, and the reference image is acquired according to the specified dimension and the constituted data determined by the reference image determining part; and an analyzed area setting part for setting an analyzed area having a specified relative position relation with the reference image, the analyzed area setting part determining the constituted data of the analyzed area based on the constituted data related to the selected information of the photographed object according to the selected information of the photographed object;

wherein the constituted data comprises morphological constituted data and auxiliary constituted data, the morphological constituted data is the constituted data representing images of the specified morphological characters of the photographed object, the auxiliary constituted data is the constituted data except the morphological constituted data, and the reference image may be acquired according to the morphological constituted data or the morphological constituted data and the auxiliary constituted data determined by the reference image determining part;

the morphological constituted data comprises constituted data of a contour image of the photographed object; and the auxiliary constituted data comprises the constituted data of the analyzed area;

wherein when a main object is assigned, the position determining part is used for setting a position parameter of the main object in the infrared thermal image, and then is used for automatically setting position parameters of other objects in the infrared thermal image according to the specified relative position relation between other objects and the main object combined with the position parameter of the main object in the infrared thermal image, and one of the main object and other objects may be the object acquired by the constituted data of the reference image or one kind of the constituted data of the reference image;

the thermal imaging device further comprises a switch controlling part for responding specified operation of a user, to perform switch controlling for the main object;

wherein the position determining part performs non-overflow maximization scaling with a fixed aspect ratio in a self-adaptive area to acquire a self-adaptive dimension according to a position and a dimension of the specified self-adaptive area in the infrared thermal image and the position of the reference image in the self-adaptive area, further to determine the specified position and the specified dimension of the reference image located in the infrared thermal image, wherein the self-adaptive area is a specified area for self-adaptively displaying the reference image in the infrared thermal image, and the self-adaptive display is the non-overflow maximization display with the fixed aspect ratio in the self-adaptive area by the reference image in the specified position of the self-adaptive area;

wherein ratios of X-axis and Y-axis between the self-adaptive area having a dimension X1, Y1 and the reference image having a dimension X2, Y2 before scaling is computed, and a smaller one of X1/X2 and Y1/Y2 is selected as a scaling ratio based on a center point of the reference image when the reference image is centered; and specified auxiliary constituted data, being data of point, line, and plane with the specified relative position relation of the reference image, is relatively stored with thermal imaging data during recording and processing;

according to the specified relative position relation between the objects acquired by the morphological constituted data and the auxiliary constituted data, one synthesized object is first synthesized, and then a specified position and a specified dimension of the synthesized object located in the infrared thermal image are set, without computing the specified position and the specified dimension of the respective acquired synthesized object in the infrared thermal image; the synthesized object with the specified dimension is continuously synthesized with the infrared thermal image generated by the thermal imaging data acquired according to the specified position, to realize a collective display of the reference image and the infrared thermal image.

2. The thermal imaging device according to claim 1, wherein the morphological constituted data comprises constituted data of a texture character of the photographed object; and the auxiliary constituted data comprises the constituted data of a prompting mark.

3. The thermal imaging device according to claim 1, wherein the synthesizing part is used for performing selective pseudo-color processing for the acquired thermal imaging data according to the specified position and the reference image with the specified dimension acquired by the determined constituted data, to acquire a synthesized image reflecting the reference image and the infrared thermal image generated by the thermal imaging data; the selective pseudo-color processing comprises:

taking the image data of the reference image in a pixel position as the image data of the synthesized image in a corresponding pixel position, the pseudo-color processing is not performed for the thermal imaging data in the corresponding pixel position, and the pseudo-color processing is performed for the thermal imaging data except the pixel position of the reference image;

the pseudo-color processing for the thermal imaging data of the pixel position of the thermal imaging data corresponding to the reference image is different from the pseudo-color processing for the thermal imaging data of other pixel positions; or the pseudo-color processing is performed after a specified value is taken away from the thermal imaging data of the pixel position in the thermal imaging data corresponding to the reference image.

4. The thermal imaging device according to claim 1, wherein the synthesizing part synthesizes the infrared thermal image and the reference image according to a specified transparency ratio to acquire the synthesized image, allowing the reference image to be semitransparent in the displayed synthesized image; and the transparency ratio represents a ratio of image data of the reference image and image data of the infrared thermal image during synthesis in a corresponding pixel of the synthesized image, a sum of the transparency ratio of the reference image and the infrared thermal image is one.

5. The thermal imaging device according to claim 1, further comprising a display controlling part for controlling a display part to display the synthesized image.

6. The thermal imaging device according to claim 5, wherein the acquiring part is used for continuously acquiring the thermal imaging data, the synthesizing part is used for continuously synthesizing the infrared thermal image and the reference image to acquire the synthesized image according to the specified position, and the infrared thermal image is generated according to the thermal imaging data continuously acquired by the acquiring part.

7. The thermal imaging device according to claim 6, wherein the acquiring part is a photographing part acquiring the thermal imaging data by photographing.

8. The thermal imaging device according to claim 1, wherein the reference image reflects the morphological characters of the contour of the photographed object.

9. The thermal imaging device according to claim 1, wherein the reference image comprises an image representing an analyzed area and/or a prompting mark.

10. The thermal imaging device according to claim 6, wherein the reference image comprises an image representing an analyzed area and/or a prompting mark.

11. The thermal imaging device according to claim 1, further comprising:
the storage part for storing the constituted data related to the information of each photographed object;
the selecting part for selecting the information of the photographed object by selection of options of the information of the photographed object, as a specified number of the options of the information of the photographed object are displayed on a specified position of a display part according to the information of the photographed object stored in the storage part.

12. The thermal imaging device according to claim 11, wherein the storage part is used for storing the information of the photographed objects and the constituted data with a plurality of types related to the information of each photographed object, and the reference image determining part is used for determining the constituted data for acquiring the reference image according to a specified determined type of the constituted data.

13. The thermal imaging device according to claim 1, wherein the constituted data determined by the reference image determining part is the morphological constituted data prestored in the storage part, the morphological constituted data acquired from a processing object under a processing rule, a combination thereof, or a combination of the morphological constituted data and the auxiliary constituted data prestored in the storage part or/and the auxiliary constituted data acquired from a computing object under a computing rule, the processing object may be the morphological constituted data stored in the storage part, the processing rule comprises one or more than one kind of processing for the processing object, the computing object may be the constituted data stored in the storage part, and the computing object may be selectively performed under one or more than one computing rule.

14. The thermal imaging device according to claim 6, wherein the constituted data determined by the reference image determining part is the morphological constituted data prestored in the storage part, the morphological constituted data acquired from a processing object under a processing rule, a combination thereof, or a combination of the morphological constituted data and the auxiliary constituted data prestored in the storage part or/and the auxiliary constituted data acquired from a computing object under a computing rule, the processing object may be the morphological constituted data stored in the storage part, the processing rule comprises one or more than one kind of processing for the processing object, the computing object may be the constituted data stored in the storage part, and the computing object may be selectively performed under one or more than one computing rule.

15. The thermal imaging device according to claim 6, further comprising:
a processing object assigned part for assigning a processing object;
an image handling part for performing specified processing for the processing object to acquire the morphological constituted data;
the storage part for storing the morphological constituted data acquired by the processing;
the reference image determining part for determining the morphological constituted data acquired by the image handling part and stored in the storage part as the constituted data related to the reference image.

16. The thermal imaging device according to claim 13, wherein the processing at least is cutting, threshold range extracting, edge extracting, enhancement, filtering, pseudo-color processing, gray scale processing, brightness adjusting, color adjusting, scaling, rotating, or a combination thereof; and the computing rule at least is scaling, warping, computing a feature point, computing a feature area, halving, computing a bounding rectangle, computing an inscribed rectangle, computing a center line for the computing object, or a combination thereof.

17. The thermal imaging device according to claim 14, wherein the processing at least is cutting, threshold range extracting, edge extracting, enhancement, filtering, pseudo-color processing, gray scale processing, brightness adjusting, color adjusting, scaling, rotating, or a combination thereof; and the computing rule at least is scaling, warping, computing a feature point, computing a feature area, halving, computing a bounding rectangle, computing an inscribed rectangle, computing a center line for the computing object, or a combination thereof.

18. The thermal imaging device according to claim 1, further comprising a transparent object assigned part for assigning an object which need to change the transparency ratio, the synthesizing part being able to respond predetermined operation of a user to change the transparency ratio of the assigned object, and the object being the reference image or one part of the reference image, a sum of the transparency ratio of the reference image and the infrared thermal image is one.

19. The thermal imaging device according to claim 6, further comprising a transparent object assigned part for assigning an object which need to change the transparency ratio, the synthesizing part being able to respond predetermined operation of a user to change the transparency ratio of the assigned object, and the object being the reference image or one part of the reference image, a sum of the transparency ratio of the reference image and the infrared thermal image is one.

20. The thermal imaging device according to claim 15, wherein the position determining part performs non-overflow maximization scaling with a fixed aspect ratio in a self-adaptive area to acquire a self-adaptive dimension according to a position and a dimension of the specified self-adaptive area in the infrared thermal image and the position of the reference image in the self-adaptive area, further to determine the specified position and the specified dimension of the reference image located in the infrared thermal image.

21. The thermal imaging device according to claim 6, further comprising:
the storage part for storing the constituted data and related position information, the position information representing a specified position and a specified dimension of an image acquired from the constituted data to be located in the infrared thermal image;
the position determining part for determining the specified position and the specified dimension represented by the position information as the specified position and the specified dimension of the image acquired from the constituted data to be located in the infrared thermal image.

22. The thermal imaging device according to claim 6, further comprising a configuration part, for configuring at least one of the constituted data related to the reference image, a processing rule, a computing rule, a position rule, a synthesized parameter, and a switching rule by a user.

23. The thermal imaging device according to claim 1, further comprising a related information setting part and a setting record part, the related information setting part being used for setting the auxiliary constituted data to which the morphological constituted data corresponds and at least one kind of related information in information of the photographed object, and the setting record part being used for building a related record between the morphological constituted data and the related information set by the related information setting part.

24. The thermal imaging device according to claim 6, further comprising a related information setting part and a setting record part, the related information setting part being used for setting the auxiliary constituted data to which the morphological constituted data corresponds and at least one kind of related information in information of the photographed object, and the setting record part being used for building a related record between the morphological constituted data and the related information set by the related information setting part.

25. The thermal imaging device according to claim 6, wherein the position determining part is used for determining the specified position, the specified dimension, and a rotating angle of the reference image located in the infrared thermal image, the synthesizing part is used for continuously synthesizing the infrared thermal image and the reference image to acquire the synthesized image according to the specified position, and the reference image is acquired according to the specified dimension, the rotating angle, and the constituted data determined by the reference image determining part.

26. The thermal imaging device according to claim 6, wherein the switch controlling part for responding specified operation of a user, performs switch controlling for at least one of the constituted data related to the reference image, a position rule, and a synthesized parameter.

27. The thermal imaging device according to claim 1, wherein the position determining part is used for responding specified operation to change a position, a dimension, a rotating angle of the reference image located in the infrared thermal image, or a combination thereof.

28. The thermal imaging device according to claim 7, wherein the thermal imaging device is a portable thermal imaging device.

29. A thermal imaging device comprising:
an acquiring part for acquiring thermal imaging data;
a storage part for storing information of photographed objects;
a selecting part for selecting information of a photographed object prestored in the storage part according to a need at a photographing scene by a user;
a reference image determining part for determining constituted data related to a reference image reflecting specified morphological characters of a photographed object, the determined constituted data being used for acquiring the reference image reflecting the specified morphological characters of the photographed object; the reference image determining part for determining the constituted data for acquiring the reference image according to the selected information of the photographed object from the stored information of photographed objects in the storage part through the selecting part and the constituted data related to the information of the photographed object; the information of the photographed object being information representing identity of the photographed object comprising a type, a name, a number, a place of the photographed object, or a combination thereof;
a position determining part for determining a specified position and a specified dimension of the reference image located in an infrared thermal image;
a display controlling part for together displaying the reference image with the specified dimension acquired by the determined constituted data and the infrared thermal image generated by the thermal imaging data according to the specified position; and
an analyzed area setting part for setting an analyzed area having a specified relative position relation with the reference image, the analyzed area setting part determining the constituted data of the analyzed area based on the constituted data related to the selected information of the photographed object according to the selected information of the photographed object;
wherein the constituted data comprises morphological constituted data and auxiliary constituted data, the morphological constituted data is the constituted data representing images of the specified morphological characters of the photographed object, the auxiliary constituted data is the constituted data except the morphological constituted data, and the reference image may be acquired according to the morphological constituted data or the morphological constituted data and the auxiliary constituted data determined by the reference image determining part;
the morphological constituted data comprises constituted data of a contour image of the photographed object; and the auxiliary constituted data comprises the constituted data of the analyzed area;
wherein when a main object is assigned, the position determining part is used for setting a position parameter of the main object in the infrared thermal image, and then is used for automatically setting position parameters of other objects in the infrared thermal image according to the specified relative position relation between other objects and the main object combined with the position parameter of the main object in the infrared thermal image, and one of the main object and other objects may be the object acquired by the constituted data of the reference image or one kind of the constituted data of the reference image;

the thermal imaging device further comprises a switch controlling part for responding specified operation of a user, to perform switch controlling for the main object;

wherein the position determining part performs non-overflow maximization scaling with a fixed aspect ratio in a self-adaptive area to acquire a self-adaptive dimension according to a position and a dimension of the specified self-adaptive area in the infrared thermal image and the position of the reference image in the self-adaptive area, further to determine the specified position and the specified dimension of the reference image located in the infrared thermal image, wherein the self-adaptive area is a specified area for self-adaptively displaying the reference image in the infrared thermal image, and the self-adaptive display is the non-overflow maximization display with the fixed aspect ratio in the self-adaptive area by the reference image in the specified position of the self-adaptive area;

wherein ratios of X-axis and Y-axis between the self-adaptive area having a dimension X1, Y1 and the reference image having a dimension X2, Y2 before scaling is computed, and a smaller one of X1/X2 and Y1/Y2 is selected as a scaling ratio based on a center point of the reference image when the reference image is centered; and specified auxiliary constituted data, being data of point, line, and plane with the specified relative position relation of the reference image, is relatively stored with thermal imaging data during recording and processing;

according to the specified relative position relation between the objects acquired by the morphological constituted data and the auxiliary constituted data, one synthesized object is first synthesized, and then a specified position and a specified dimension of the synthesized object located in the infrared thermal image are set, without computing the specified position and the specified dimension of the respective acquired synthesized object in the infrared thermal image; the synthesized object with the specified dimension is continuously synthesized with the infrared thermal image generated by the thermal imaging data acquired according to the specified position, to realize a collective display of the reference image and the infrared thermal image.

30. The thermal imaging device according to claim 29, wherein the acquiring part is used for continuously acquiring the thermal imaging data, and the display controlling part is used for together displaying the reference image with the specified dimension acquired by the determined constituted data and the infrared thermal image generated by the continuously acquired thermal imaging data according to the specified position.

31. A thermal image photographing method comprising:
an acquiring step for acquiring thermal imaging data;
a storage step for storing information of photographed objects;
a selecting step for selecting information of a photographed object prestored in the storage step according to a need at a photographing scene by a user;
a reference image determining step for determining constituted data related to a reference image reflecting specified morphological characters of a photographed object, the determined constituted data being used for acquiring the reference image reflecting the specified morphological characters of the photographed object; the reference image determining step for determining the constituted data for acquiring the reference image according to the selected information of the photographed object from the stored information of photographed objects in the storage step through the selecting step and the constituted data related to the information of the photographed object; the information of the photographed object being information representing identity of the photographed object comprising a type, a name, a number, a place of the photographed object, or a combination thereof;
a position determining step for determining a specified position and a specified dimension of the reference image located in an infrared thermal image;
a synthesizing step for synthesizing the infrared thermal image and the reference image to acquire a synthesized image according to the specified position, the infrared thermal image being generated according to the thermal imaging data acquired in the acquiring step, and the reference image being acquired according to the specified dimension and the constituted data determined in the reference image determining step; and
an analyzed area setting step for setting an analyzed area having a specified relative position relation with the reference image, the analyzed area setting step determining the constituted data of the analyzed area based on the constituted data related to the selected information of the photographed object according to the selected information of the photographed object;
wherein the constituted data comprises morphological constituted data and auxiliary constituted data, the morphological constituted data is the constituted data representing images of the specified morphological characters of the photographed object, the auxiliary constituted data is the constituted data except the morphological constituted data, and the reference image may be acquired according to the morphological constituted data or the morphological constituted data and the auxiliary constituted data determined by the reference image determining step;
the morphological constituted data comprises constituted data of a contour image of the photographed object; and the auxiliary constituted data comprises the constituted data of the analyzed area;
wherein when a main object is assigned, the position determining step is used for setting a position parameter of the main object in the infrared thermal image, and then is used for automatically setting position parameters of other objects in the infrared thermal image according to the specified relative position relation between other objects and the main object combined with the position parameter of the main object in the infrared thermal image, and one of the main object and other objects may be the object acquired by the constituted data of the reference image or one kind of the constituted data of the reference image;
the thermal image photographing method further comprises a switch controlling step for responding specified operation of a user, to perform switch controlling for the main object;
wherein the position determining step performs non-overflow maximization scaling with a fixed aspect ratio in a self-adaptive area to acquire a self-adaptive dimension according to a position and a dimension of the specified self-adaptive area in the infrared thermal image and the position of the reference image in the self-adaptive area, further to determine the specified position and the specified dimension of the reference image located in the infrared thermal image, wherein the self-adaptive area is a specified area for self-adaptively displaying the reference image in the infrared thermal image, and the self-adaptive display is the non-overflow maximization display with the fixed aspect ratio in the self-adaptive area by the reference image in the specified position of the self-adaptive area;

wherein ratios of X-axis and Y-axis between the self-adaptive area having a dimension X1, Y1 and the reference image having a dimension X2, Y2 before scaling is computed, and a smaller one of X1/X2 and Y1/Y2 is selected as a scaling ratio based on a center point of the reference image when the reference image is centered; and specified auxiliary constituted data, being data of point, line, and plane with the specified relative position relation of the reference image, is relatively stored with thermal imaging data during recording and processing;

according to the specified relative position relation between the objects acquired by the morphological constituted data and the auxiliary constituted data, one synthesized object is first synthesized, and then a specified position and a specified dimension of the synthesized object located in the infrared thermal image are set, without computing the specified position and the specified dimension of the respective acquired synthesized object in the infrared thermal image; the synthesized object with the specified dimension is continuously synthesized with the infrared thermal image generated by the thermal imaging data acquired according to the specified position, to realize a collective display of the reference image and the infrared thermal image.

32. A thermal image photographing method comprising:
an acquiring step for acquiring thermal imaging data;
a storage step for storing information of photographed objects;
a selecting step for selecting information of a photographed object prestored in the storage step according to a need at a photographing scene by a user;
a reference image determining step for determining constituted data related to a reference image reflecting specified morphological characters of a photographed object, the determined constituted data being used for acquiring the reference image reflecting the specified morphological characters of the photographed object; the reference image determining step for determining the constituted data for acquiring the reference image according to the selected information of the photographed object from the stored information of photographed objects in the storage step through the selecting step and the constituted data related to the information of the photographed object; the information of the photographed object being information representing identity of the photographed object comprising a type, a name, a number, a place of the photographed object, or a combination thereof;
a position determining step for determining a specified position and a specified dimension of the reference image located in an infrared thermal image;
a display controlling step for displaying the reference image with the specified dimension acquired by the assigned constituted data and the infrared thermal image generated by the thermal imaging data together according to the specified position; and
an analyzed area setting step for setting an analyzed area having a specified relative position relation with the reference image, the analyzed area setting step determining the constituted data of the analyzed area based on the constituted data related to the selected information of the photographed object according to the selected information of the photographed object;

wherein the constituted data comprises morphological constituted data and auxiliary constituted data, the morphological constituted data is the constituted data representing images of the specified morphological characters of the photographed object, the auxiliary constituted data is the constituted data except the morphological constituted data, and the reference image may be acquired according to the morphological constituted data or the morphological constituted data and the auxiliary constituted data determined by the reference image determining step;

the morphological constituted data comprises constituted data of a contour image of the photographed object; and the auxiliary constituted data comprises the constituted data of the analyzed area;

wherein when a main object is assigned, the position determining step is used for setting a position parameter of the main object in the infrared thermal image, and then is used for automatically setting position parameters of other objects in the infrared thermal image according to the specified relative position relation between other objects and the main object combined with the position parameter of the main object in the infrared thermal image, and one of the main object and other objects may be the object acquired by the constituted data of the reference image or one kind of the constituted data of the reference image;

the thermal image photographing method further comprises a switch controlling method for responding specified operation of a user, to perform switch controlling for the main object;

wherein the position determining step performs non-overflow maximization scaling with a fixed aspect ratio in a self-adaptive area to acquire a self-adaptive dimension according to a position and a dimension of the specified self-adaptive area in the infrared thermal image and the position of the reference image in the self-adaptive area, further to determine the specified position and the specified dimension of the reference image located in the infrared thermal image, wherein the self-adaptive area is a specified area for self-adaptively displaying the reference image in the infrared thermal image, and the self-adaptive display is the non-overflow maximization display with the fixed aspect ratio in the self-adaptive area by the reference image in the specified position of the self-adaptive area;

wherein ratios of X-axis and Y-axis between the self-adaptive area having a dimension X1, Y1 and the reference image having a dimension X2, Y2 before scaling is computed, and a smaller one of X1/X2 and Y1/Y2 is selected as a scaling ratio based on a center point of the reference image when the reference image is centered; and specified auxiliary constituted data, being data of point, line, and plane with the specified relative position relation of the reference image, is relatively stored with thermal imaging data during recording and processing;

according to the specified relative position relation between the objects acquired by the morphological constituted data and the auxiliary constituted data, one synthesized object is first synthesized, and then a specified position and a specified dimension of the synthesized object located in the infrared thermal image are set, without computing the specified position and the specified dimension of the respective acquired synthesized object in the infrared thermal image; the synthesized object with the specified dimension is continuously synthesized with the infrared thermal image generated by the thermal imaging data acquired according to the specified position, to realize a collective display of the reference image and the infrared thermal image.

33. The thermal image photographing method according to claim 31, further comprising a display controlling step for controlling a display part to display the synthesized image.

34. The thermal image photographing method according to claim 33, wherein the acquiring step is used for continuously acquiring the thermal imaging data, the synthesizing step is used for continuously synthesizing the infrared thermal image and the reference image to acquire the synthesized image according to the specified position, and the infrared thermal image is generated according to the thermal imaging data continuously acquired in the acquiring step.

35. The thermal image photographing method according to claim 31, wherein the selecting step is used for selecting the information of the photographed object by selection of options of the information of the photographed object, as a specified number of the options of the information of the photographed object are displayed on a specified position of a display part according to the information of the photographed object stored in the storage part.

36. The thermal image photographing method according to claim 31, wherein the switch controlling step for responding specified operation of a user, performs switch controlling for at least one of the constituted data related to the reference image, a position rule, and a synthesized parameter.

37. The thermal image photographing method according to claim 32, wherein the switch controlling step for responding specified operation of a user, performs switch controlling for at least one of the constituted data related to the reference image, a position rule, and a synthesized parameter.

* * * * *